(12) United States Patent
Zhou et al.

(10) Patent No.: US 11,592,462 B2
(45) Date of Patent: Feb. 28, 2023

(54) DIAMOND PROBE HOSTING AN ATOMIC SIZED DEFECT

(71) Applicant: President and Fellows of Harvard College, Cambridge, MA (US)

(72) Inventors: Xu Zhou, Cambridge, MA (US); Rainer Joachim Stohr, Stuttgart (DE); Ling Xie, Cambridge, MA (US); Amir Yacoby, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 149 days.

(21) Appl. No.: 16/494,217

(22) PCT Filed: Mar. 13, 2018

(86) PCT No.: PCT/US2018/022236
§ 371 (c)(1),
(2) Date: Sep. 13, 2019

(87) PCT Pub. No.: WO2018/169997
PCT Pub. Date: Sep. 20, 2018

(65) Prior Publication Data
US 2020/0088762 A1    Mar. 19, 2020

Related U.S. Application Data

(60) Provisional application No. 62/470,687, filed on Mar. 13, 2017.

(51) Int. Cl.
*G01Q 70/14* (2010.01)
*G01Q 60/38* (2010.01)

(52) U.S. Cl.
CPC ............. *G01Q 70/14* (2013.01); *G01Q 60/38* (2013.01)

(58) Field of Classification Search
None
See application file for complete search history.

(56) References Cited

U.S. PATENT DOCUMENTS 5,204,581 A * 4/1993 Andreadakis ........... H01J 9/025
                                                      313/336
6,027,951 A * 2/2000 MacDonald ........... G01Q 70/10
                                                      438/20

(Continued)

FOREIGN PATENT DOCUMENTS

WO    WO-2015/175398         11/2015
WO    WO-2015175398 A1 * 11/2015 ............... A61B 5/01

OTHER PUBLICATIONS

Maletinsky et al., ("A robust scanning diamond sensor for nanoscale imaging with single nitrogen-vacancy centres,", Nature Nanotechnology, May 15, 2012. vol. 7, pp. 320-324).*

(Continued)

*Primary Examiner* — Andrew Smyth
(74) *Attorney, Agent, or Firm* — Wilmer Cutler Pickering Hale and Dorr LLP

(57) ABSTRACT

A method of manufacturing, characterizing, mounting, and a system of a probe may include a pillar having a taper angle and at least one engineered defect. The taper angle may be formed using crystallographic- or etching-based techniques. The probe may be mounted to an AFM chip. Furthermore, an RF waveguide may be connected to the AFM chip for providing RF excitation.

10 Claims, 25 Drawing Sheets

(56) References Cited

U.S. PATENT DOCUMENTS

| | | | |
|---|---|---|---|
| 11,293,940 B2 | 4/2022 | Degen et al. | |
| 2014/0350375 A1* | 11/2014 | Wolfe | H01L 33/382 600/377 |
| 2016/0169822 A1* | 6/2016 | Espinosa | G01Q 10/00 324/649 |
| 2018/0147417 A1* | 5/2018 | Rantala | H01L 33/08 |
| 2018/0203037 A1* | 7/2018 | Walter | G01Q 30/14 |
| 2019/0292315 A1* | 9/2019 | Niemiec | C08G 81/00 |
| 2020/0009286 A1* | 1/2020 | Zarcone | F21S 9/022 |

OTHER PUBLICATIONS

Pelliccione et al., ("Scanned probe imaging of nanoscale magnetism at cryogenic temperatures with a single-spin quantum sensor," Nature Nanotechnology, Aug. 2016, vol. 11, pp. 700-705.).*

Appel et al., "Nanoscale microwave imaging with a single electron spin in diamond," New Journal of Physis, Nov. 3, 2015, vol. 17 (112001). 6 pages.

Geim et al., "Van der Waals heterostructures," Nature, Jul. 25, 2013, vol. 499, pp. 419-425.

Grinolds et al., "Subnanometre resolution in three-dimensional magnetic resonance imaging of individual dark spins," Nature Nanotechnology, Apr. 2014, vol. 9, No. 4, pp. 279-284.

Grinolds et al., "Nanoscale magnetic imaging of a single electron spin under ambient conditions," Nature Physics, Apr. 2013, vol. 9, pp. 215-219.

Guslienko et al., "Magnetostatic Green's functions for the description of spin waves in finite rectangular magnetic dots and stripes," Journal of Magnetism and Magnetic Materials, Oct. 2011, vol. 323, Issues 18-19, pp. 2418-2424.

Hwang et al., "Emergent phenomena at oxide interfaces," Nature Materials, Jan. 24, 2012, vol. 11, pp. 103-113. 25 pages.

International Search Report and Written Opinion dated Jul. 9, 2018, in the International Application No. PCT/US18/22236. 17 pages.

Kleinlein et al., "NV-center diamond cantilevers: Extending the range of available fabrication methods," Microelectronic Engineering, Jun. 15, 2016, vol. 159, pp. 70-74.

Kolkowitz et al., "Probing Johnson noise and ballistic transport in normal metals with a single-spin qubit," Science, Mar. 6, 2015, vol. 347, Issue 6226, pp. 1129-1132.

Lee et al., "Nanoscale scanning probe ferromagnetic resonance imaging using localized modes," Nature, Aug. 12, 2010, vol. 466, pp. 845-848.

Luan et al., "Decoherence imaging of spin ensembles using a scanning single-electron spin in diamond," Scientific Reports, Jan. 29, 2015, vol. 5, No. 8119. 5 pages.

Martin et al., "Localization of Fractionally charged Quasi-Particles," Science, Aug. 13, 2004, vol. 305, Issue 5686, pp. 980-983.

Nowack et al., "Imaging currents in HgTe quantum wells in the quantum spin Hall regime," Nature Materials, Sep. 2013, vol. 12, No. 9, pp. 787-791.

Rondin et al., "Nanoscale magnetic field mapping with a single spin scanning probe magnetometer," Applied Physics Letters, vol. 100, 153118, published online Apr. 12, 2012. arXiv:1108.4438v3. 10 pages.

Rondin et al., "Stray-field imaging of magnetic vortices with a single diamond spin," Nature Communications, Jul. 31, 2013, vol. 4, No. 2279. 5 pages.

Stroscio et al., "Atomic and Molecular Manipulation with the Scanning Tunneling Microscope," Science, Nov. 29, 1991, vol. 254, Issue 5036, pp. 1319-1326. 9 pages.

Tetienne et al., "Magnetic-field-dependent photodynamics of single NV defects in diamond: an application to qualitative all-optical magnetic imaging," New Journal of Physics, Oct. 2012, vol. 14:103033. 16 pages.

Tetienne et al., "Nanoscale imaging and control of domain-wall hopping with a nitrogen-vacancy center microscope," Science, Jun. 20, 2014, vol. 344, Issue 6190, pp. 1366-1369.

Tetienne et al., "Quantum imaging of current flow in graphene," Science Advances, Apr. 26, 2017, vol. 3(4):e1602429. 7 pages.

Thiel et al., "Quantitative nanoscale vortex imaging using a cryogenic quantum magnetometer," Nature Nanotechnology, vol. 11, No. 8, pp. 677-681. Submitted Nov. 9, 2015arXiv:1511.02873v1. 10 pages.

Van der Sar et al., "Nanometre-scale probing of spin waves using single electron spins," Nature Communications, Aug. 7, 2015, vol. 6, article 7886, Erratum. 8 pages.

Vasyukov et al., "A scanning superconducting quantum interference device with single electron spin sensitivity," Nature Nanotechnology, Sep. 2013, vol. 8, No. 9, pp. 639-644.

\* cited by examiner

| RF substrate power [W] | DC bias [V] | Angle θ [degree] | Crystal planes (hkl) |
|---|---|---|---|
| 0 | 0 | 35 | 111 |
| 5 | 15 | 25 | 332 |
| 10-20 | 22-34 | 19 | 221 |
| 30-40 | 47-60 | 12 | 331 |

| Condition | ICP(W) | RF Power(W) | O2(sccm) | Ar(sccm) | Pressure(mTorr) | Time (min) | Depth (nm) | NanoPillar taper Angle (degrees) |
|---|---|---|---|---|---|---|---|---|
| 1 | 900 | 120 | 45 | 0 | 10 | 6 | 1722 | 3.4 |
| 2 | 900 | 30 | 45 | 0 | 10 | 17 | 2180 | 11.7 |
| 3 | 900 | 80 | 45 | 0 | 10 | 8 | 2048 | 7.5 |
| 4 | 900 | 40 | 45 | 0 | 10 | 15 | 2406 | 11.5 |
| 5 | 900 | 7 | 45 | 0 | 10 | 35 | 1834 | 20.5 |
| 6 | 900 | 5 | 45 | 0 | 10 | 70 | 1973 | 22 |
| 7 | 900 | 20 | 45 | 0 | 10 | 10 | 2110 | 18.3 |

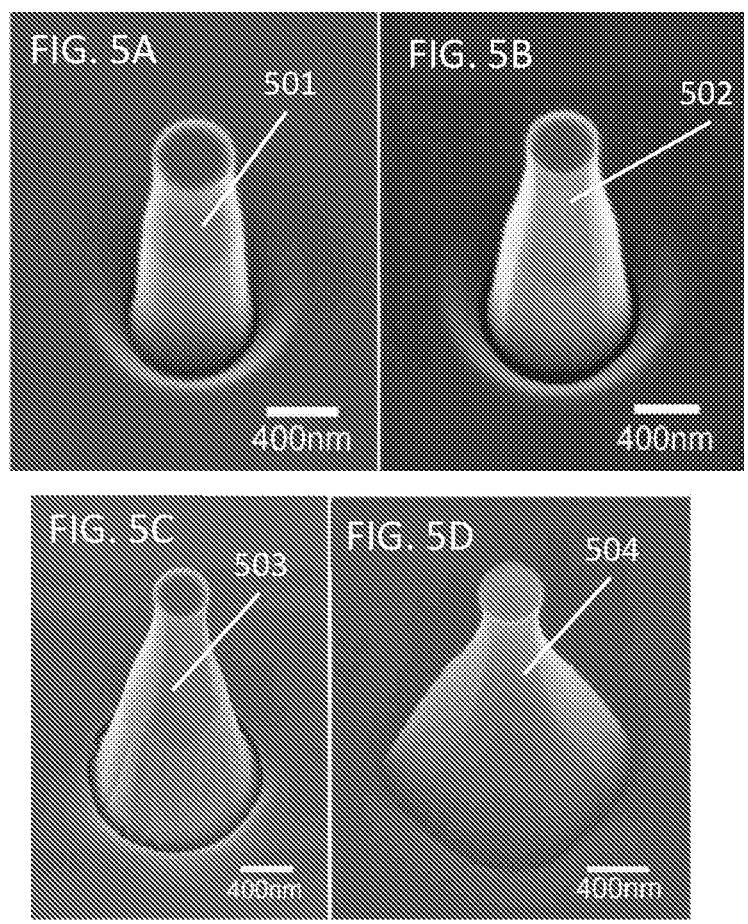

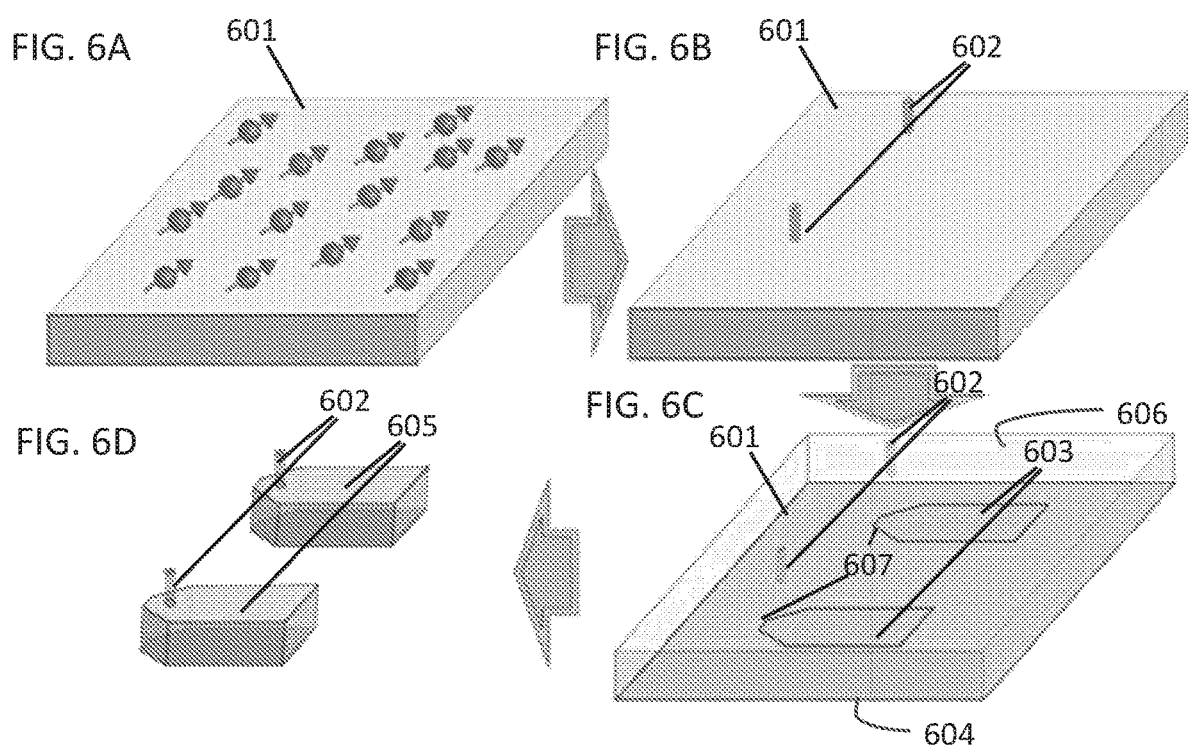

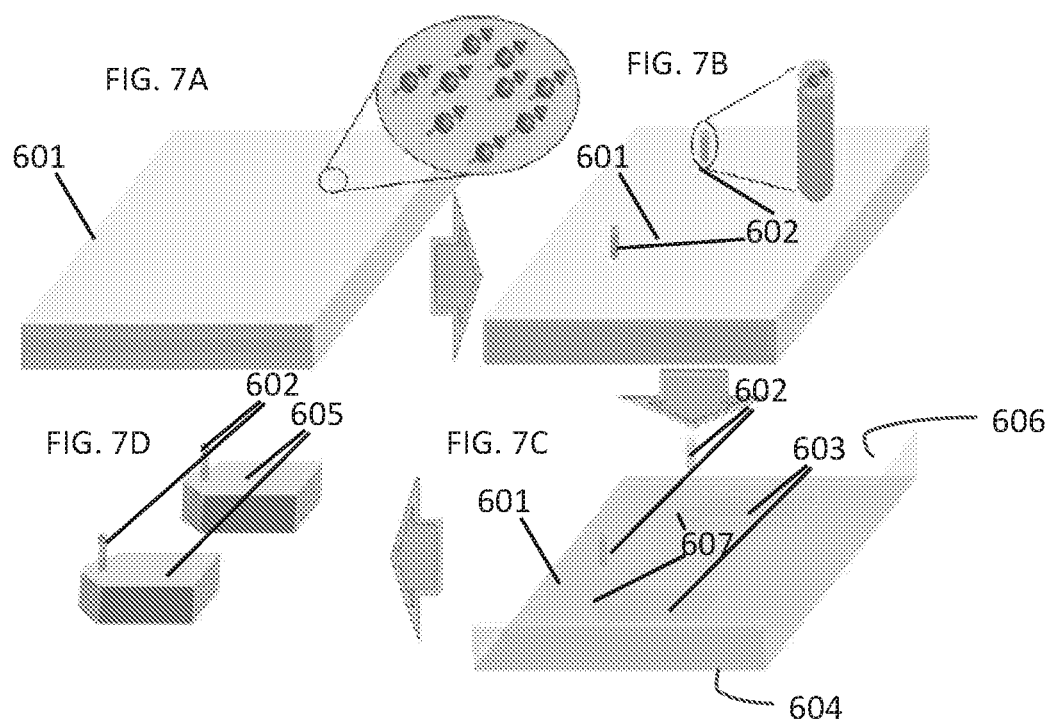

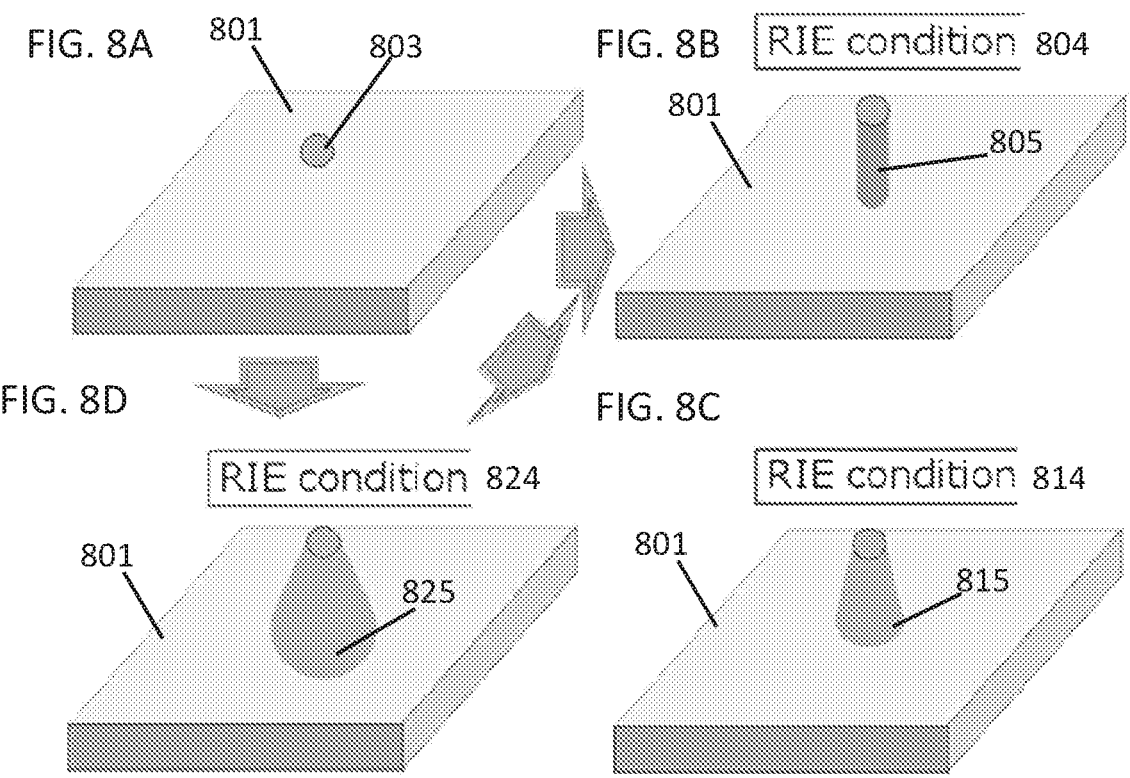

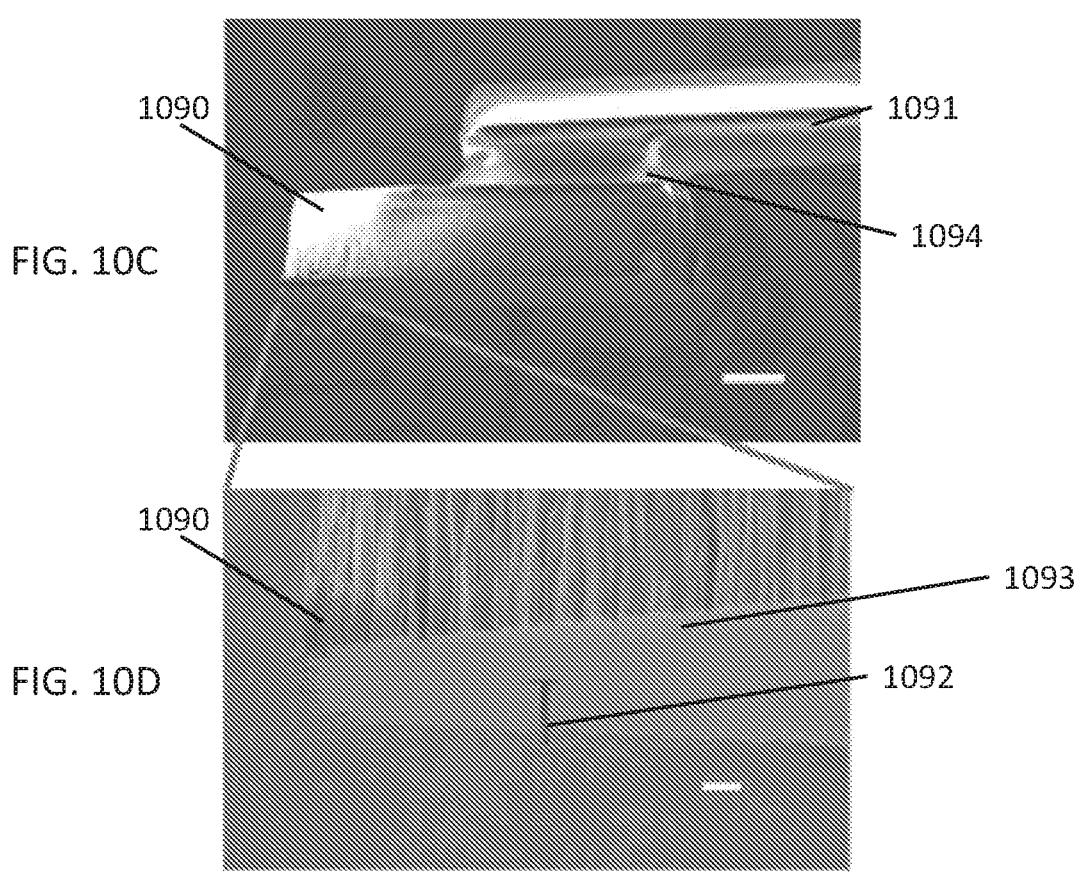

FIG. 13A
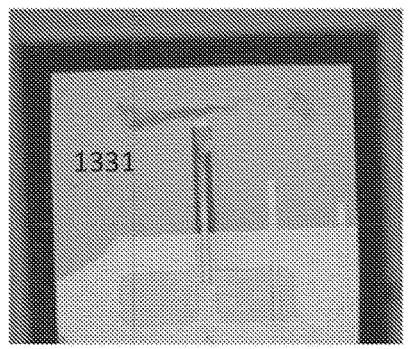
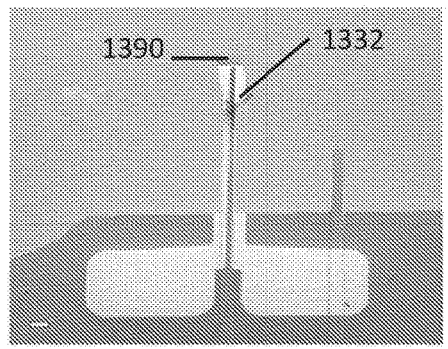
FIG. 13B
FIG. 13C
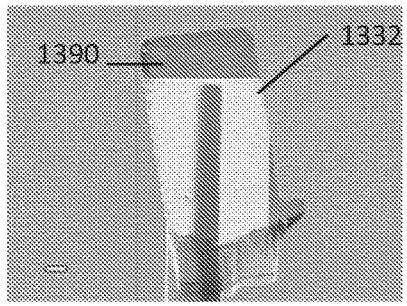

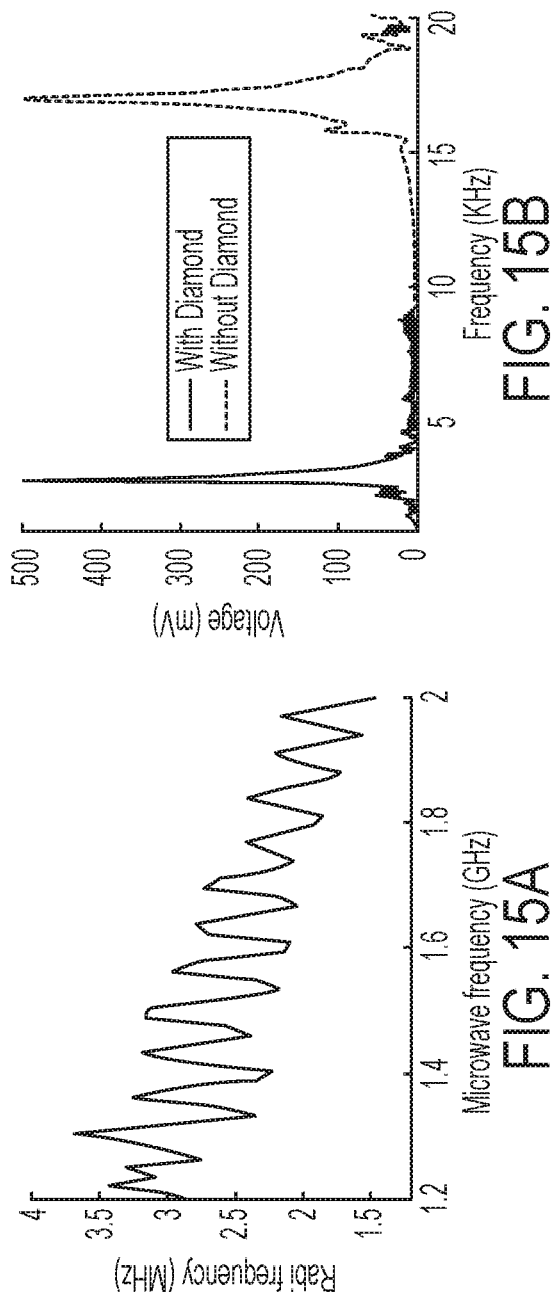
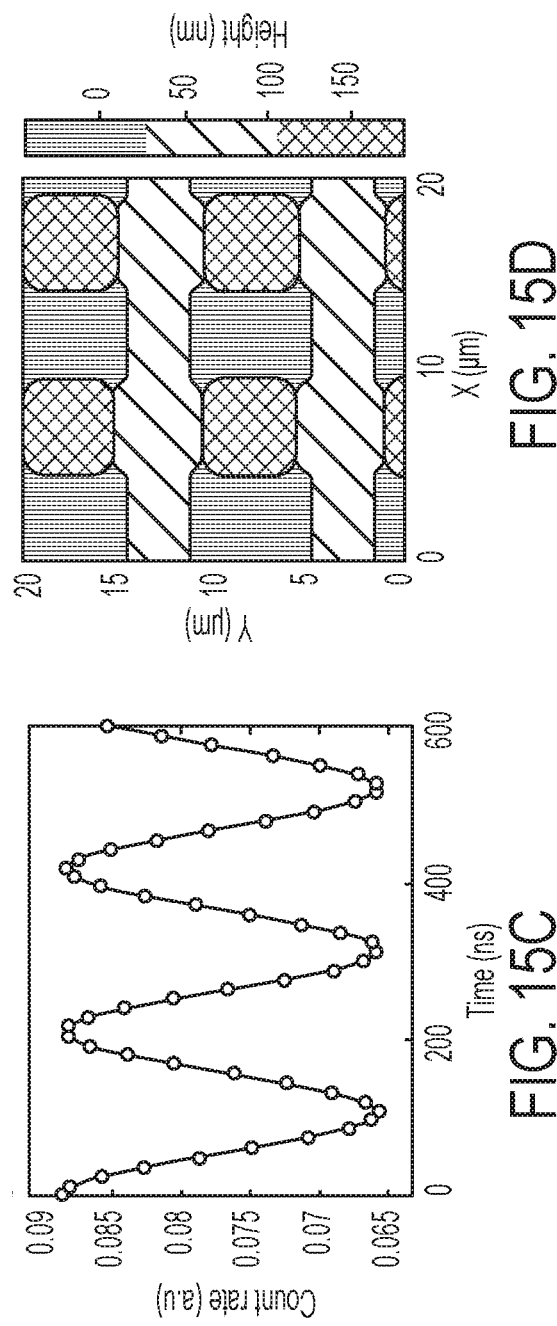
FIG. 15A
FIG. 15B
FIG. 15C
FIG. 15D

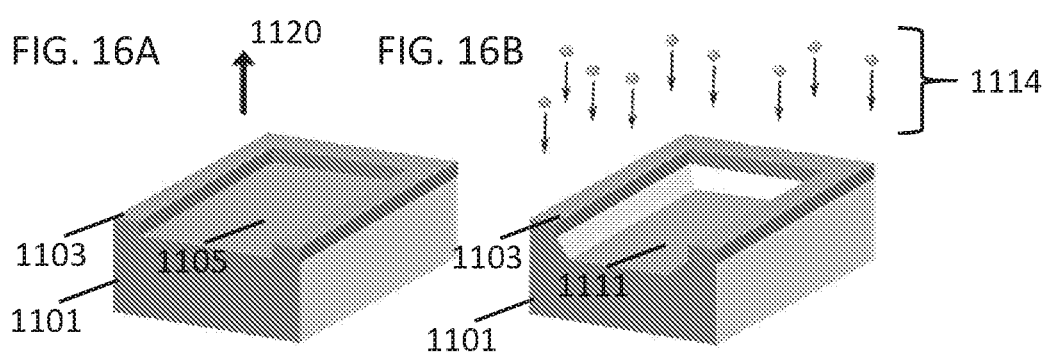
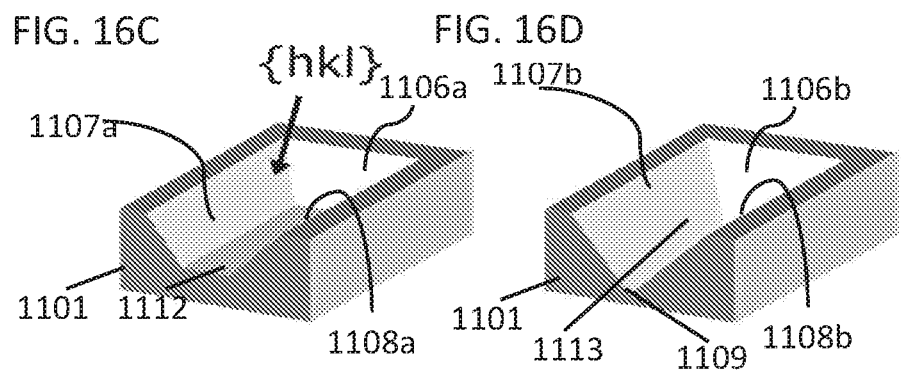

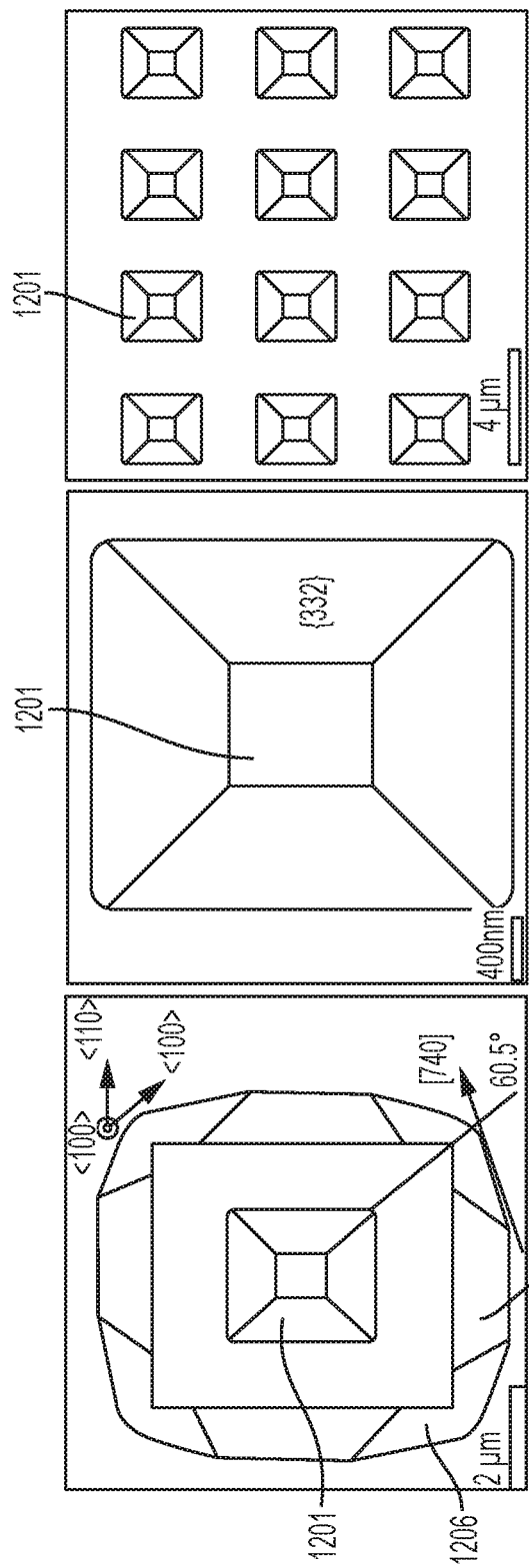

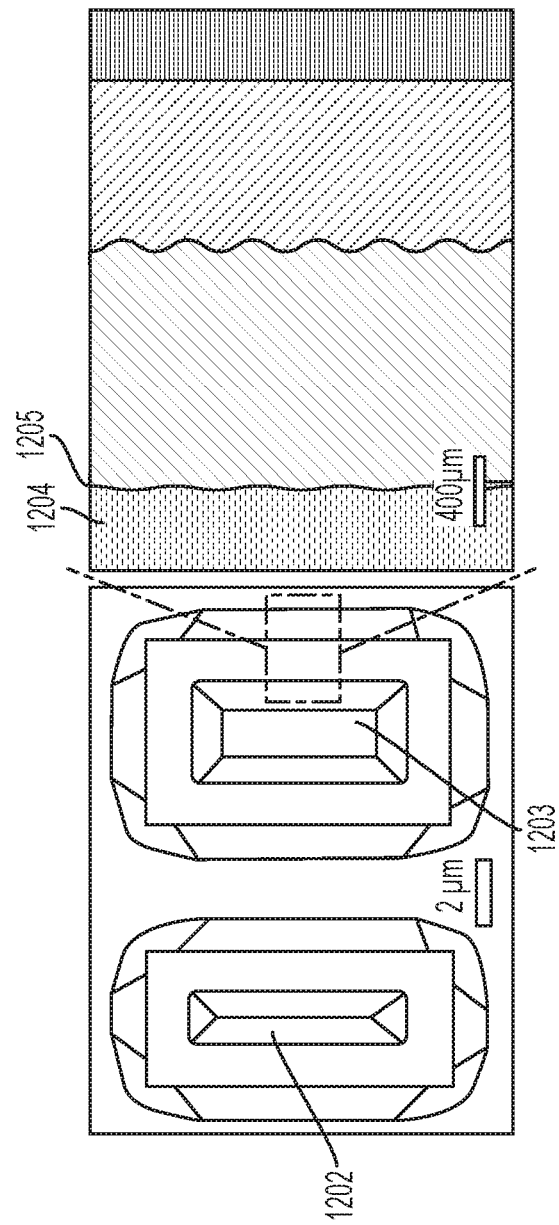

US 11,592,462 B2

DIAMOND PROBE HOSTING AN ATOMIC SIZED DEFECT

CROSS-REFERENCE TO RELATED APPLICATIONS

This Application is a U.S. National Phase Application of PCT/US2018/22236, entitled "DIAMOND PROBE HOSTING AN ATOMIC SIZED DEFECT," filed on Mar. 13, 2018, which claims priority to U.S. Patent Application No. 62/470,687, entitled "Diamond Probe Hosting an Atomic Sized Defect," filed Mar. 13, 2017, the contents of each of which are incorporated herein by reference.

STATEMENT OF GOVERNMENT RIGHTS

This invention was made with government support under Grant No. 911NF-17-1-0023 awarded by the U.S. Department of Defense. The government has certain rights in the invention.

COPYRIGHT NOTICE

This patent disclosure may contain material that is subject to copyright protection. The copyright owner has no objection to the facsimile reproduction by anyone of the patent document or the patent disclosure as it appears in the U.S. Patent and Trademark Office patent file or records, but otherwise reserves any and all copyright rights.

FIELD OF THE INVENTION

This patent relates to diamond probes, and more specifically to probes using NV centers for nanoscale detection.

BACKGROUND

The nitrogen-vacancy (NV) center in diamond has played a unique role in quantum information and magnetometry. NV magnetometry was used to investigate many fundamental physics studies and develop a number of industrial applications. One of the powerful aspects of NV magnetometry is the ability to scan in space to perform spatial magnetic field sensing with nanometer resolution. As an emerging scanning probe technique, it faces a huge challenge to being widely adopted due to its complexity in fabrication.

Diamond is a metastable allotrope of carbon, where the carbon atoms are arranged in a variation of a face-centered cubic crystal structure called a diamond lattice. It is notable for its mechanical strength, chemical inertness, thermal properties, and wide-band optical transparency. Diamond further serves as a host material for a variety of atomic defects, some of which show interesting quantum-mechanical spin and optical properties. The presence of such atomic defect centers is important for quantum computing, magnetometry, and photonics. For such applications, optimizing the diamond structure in relation to the defect center on the micro- and nanoscales and along particular crystal directions may be important. Developing new etching techniques and processes is a critical step for successfully fabricating devices in diamond.

Nitrogen-vacancy (NV)-based nanoscale sensing is possible because the NV center forms a bright and stable single-photon source for optical imaging and has a spin-triplet ground state that offers excellent magnetic and electric field sensing capabilities. The remarkable performance of the NV center in such spin-based sensing schemes is the result of the long NV spin coherence time, combined with efficient optical spin preparation and readout. These properties persist from cryogenic temperatures to ambient conditions, a feature that distinguishes the NV center from other systems proposed as quantum sensors, such as single molecules or quantum dots. Reducing the distance between the NV center and the sample of interest is crucial for improving spatial resolution. Past experiments aimed at implementing scanning NV microscopes were focused on grafting diamond nanocrystals onto scanning probe tips. Although used successfully in the past, this approach suffers from the poor sensing performance of nanocrystal-based NV centers, for which the spin coherence times are typically orders of magnitude shorter than for NVs in bulk diamond.

The ability to transform single crystalline materials into desired shapes is vital in nanotechnology. In micro- and nanoscale fabrication, controlling etch direction is essential to achieve the specific shapes in single crystal materials required by device applications. Developing new manufacturing techniques and processes is therefore critical for successful realization of complex devices.

Monolithic diamond nanopillars have been fabricated on thinned down diamond cantilevers to increase photon collection efficiency. Single photon count rates of up to $1.4 \times 10^6$ per second could be observed with T2 coherence times typically around 30-90 μs. However, fabrication and handling of monolithic diamond membranes as thin as 1-5 μm is challenging, making it difficult to manipulate and attach such micron-sized diamond cantilevers onto a scanning-probe platform. Probes that may be implemented in a wider range of environments is desirable.

SUMMARY OF INVENTION

According to an embodiment, the present disclosure describes a novel fabrication process to manufacture quantum nano-sensors based on functional diamond micro- and nano-structures. The sensor may consist of a diamond nano-pillar monolithically fabricated on a substantially cubical diamond microstructure. The pillar may be used to probe the surface of the sample under study and hosts either a single engineered defect, such as an NV center, or an assembly of such defects (e.g., NV centers). Further, the present disclosure also describes a technique for mounting the sensor structure onto commercial AFM cantilevers.

Aspects of the present disclosure may include a method of fabricating a probe, the method comprising: providing a substrate including at least one engineered defect; applying an etch mask to a first surface of the substrate to form at least one pillar mask portion; etching the first surface to produce at least one pillar using at least one etching condition, wherein the pillar comprises: a base, a tip, a tapered portion extending from the base toward the tip, the tapered portion having a taper angle controlled by the etching condition, and at least one of the at least one engineered defect; applying a second etch mask film to an opposing second surface of the substrate, the second etch mask configured to provide: a masked area located on the second surface configured to mask an area containing the pillar, and an exposed area substantially surrounding the masked area; and etching the exposed area of the opposing surface of the substrate to release a portion of the substrate comprising the pillar, wherein the released portion comprises the probe.

In another aspect, the at least one engineered defect comprises a plurality of engineered defects, and wherein the etching the first surface to produce at least one pillar using the at least one etching condition comprises etching the first surface to produce a plurality of pillars using the at least one etching condition.

In another aspect, a density of the plurality of engineered defects on the substrate is configured to provide at least one defect in at least one of the plurality of pillars.

In another aspect, the density of the plurality of engineered defects on the substrate is configured to provide a plurality of defects in at least one of the plurality of pillars.

In another aspect, the engineered defect is proximate to a first surface of the substrate.

In another aspect, the pillar comprises a plurality of engineered defects.

In another aspect, the tapered portion is a waveguide.

In another aspect, the taper angle is determined by a faceting characteristic of the substrate.

In another aspect, the taper angle is between 3.4 to 35 degrees.

In another aspect, the at least one etching condition comprises controlling an RF substrate power.

In another aspect, the substrate power is between 0-40 W.

In another aspect, the method may include etching a lens structure on the second surface, wherein the lens structure is configured to focus light emitted by the at least one engineered defect in the at least one pillar In another aspect, a thickness of the etched substrate is between 2 and 160 times the height of the pillar.

In another aspect, the method may include mounting the probe onto a cantilever of an atomic force microscopy (AFM) chip.

In another aspect, the method may include placing a radio frequency (RF) waveguide in close proximity to the probe.

In another aspect, the placing the radio (RF) waveguide in close proximity to the probe comprises at least one of: printing a conductive material on at least one of a surface of the cantilever and the second surface of the probe, and attaching an RF micro-antenna to the AFM chip.

In another aspect, at least one of the etching the first surface and the etching the exposed area of the opposing surface of the substrate comprises reactive-ion etching (RIE).

In another aspect, the at least one etching condition comprises aligning the first etch mask to a crystallographic direction of the substrate In another aspect, the etching the first surface comprises RIE-ICP.

In another aspect, the at least one etching condition comprises adjusting an electron beam lithography (EBL) exposure dose of the first mask and adjusting an RIE-ICP recipe of the etching the first surface.

Aspects of the present disclosure may include a probe system comprising: an atomic force microscopy (AFM) chip; an RF waveguide attached to the AFM chip; and a probe, the probe comprising: a substrate having a first surface and a second surface opposite the first surface, and a pillar, the pillar comprising: a base connected to the first surface, a tip opposite the base, a tapered portion extending from the base toward the tip, the tapered portion having a taper angle, and at least one engineered defect; and wherein the second surface of the probe is attached to the AFM chip.

In another aspect, the RF waveguide is in close proximity to the probe.

In another aspect, the second surface of the probe is attached to the protrusion by an adhesive.

In another aspect, the taper angle is between 3.4 and 35 degrees.

In another aspect, the substrate further comprises a lens structure etched on the second surface for focusing light emitted by the at least one engineered defect in the pillar.

In another aspect, a thickness of the etched substrate is between 2 and 160 times the height of the pillar.

In another aspect, the probe is attached to one of a cantilever and a quartz rod of the AFM chip.

In another aspect, the RF waveguide attached to the AFM chip comprises a metal strip applied to the second surface of the probe In another aspect, the RF waveguide attached to the AFM chip comprises a metal wire attached to the AFM chip.

In another aspect, the RF waveguide attached to the AFM chip comprises a metal layer disposed on the second surface of the probe and extending over an edge of the probe in the proximity of the pillar.

Aspects of the present disclosure may include method of fabricating a probe, the method comprising: providing a substrate including at least one engineered defect; applying an etch mask to a first surface of the substrate to form at least one pillar mask portion; etching the first surface to produce at least one pillar, wherein the pillar comprises: a base, a tip, a tapered portion extending from the base toward the tip, the tapered portion having a taper angle, and at least one of the at least one engineered defect; applying a second etch mask film to an opposing second surface of the substrate, the second etch mask configured to provide: a masked area located on the second surface configured to mask an area containing the pillar, and an exposed area substantially surrounding the masked area; and etching the exposed area of the opposing surface of the substrate to release a portion of the substrate comprising the pillar, wherein the released portion comprises the probe.

In another aspect, the etching comprises oxygen-based reactive ion etching.

In another aspect, the method may include depositing an adhesion layer on the first surface of the substrate prior to applying the electron-sensitive film to the first surface of the substrate.

In another aspect, the etch mask film comprises titanium.

In another aspect, the etching the exposed area of the second surface of the substrate comprises oxygen-based reactive ion etching.

In another aspect, each pillar of the at least one pillars has a width of at least 10 microns and a thickness of at least 10 microns.

In another aspect, the etching the uncovered portions of the first surface of the substrate comprises selecting an etching condition based on a desired degree of tapering of pillars of the plurality of pillars.

In another aspect, the method may include placing a radio frequency (RF) waveguide on the first surface of the cantilever.

In another aspect, the at least one engineered defect includes a nitrogen-vacancy (NV) center.

BRIEF DESCRIPTION OF FIGURES

The following figures are provided for the purpose of illustration only and are not intended to be limiting.

FIGS. 5A-F are scanning electron microscope (SEM) images of monolithic nanopillars and graphical displays of taper angle properties, according to some embodiments.

FIGS. 6A-D show a perspective view of a fabrication process of probes, according to an embodiment.

FIGS. 7A-D show a perspective view of a fabrication process of probes, according to an embodiment.

FIGS. 8A-D show a perspective view of a fabrication process for making probes of different taper angles, according to an embodiment.

FIGS. 10A-E show probes affixed to AFM instruments, according to various embodiments.

FIGS. 13A-C shows a method of patterning an RF waveguide onto a probe, according to an embodiment.

FIGS. 15A-D show characteristics of and images taken using probes, according to an embodiment.

FIG. 16A-D show a technique for etching a substrate, according to an embodiment.

FIG. 17A-E show etched substrates, according to some embodiments.

DETAILED DESCRIPTION

Figure 1:
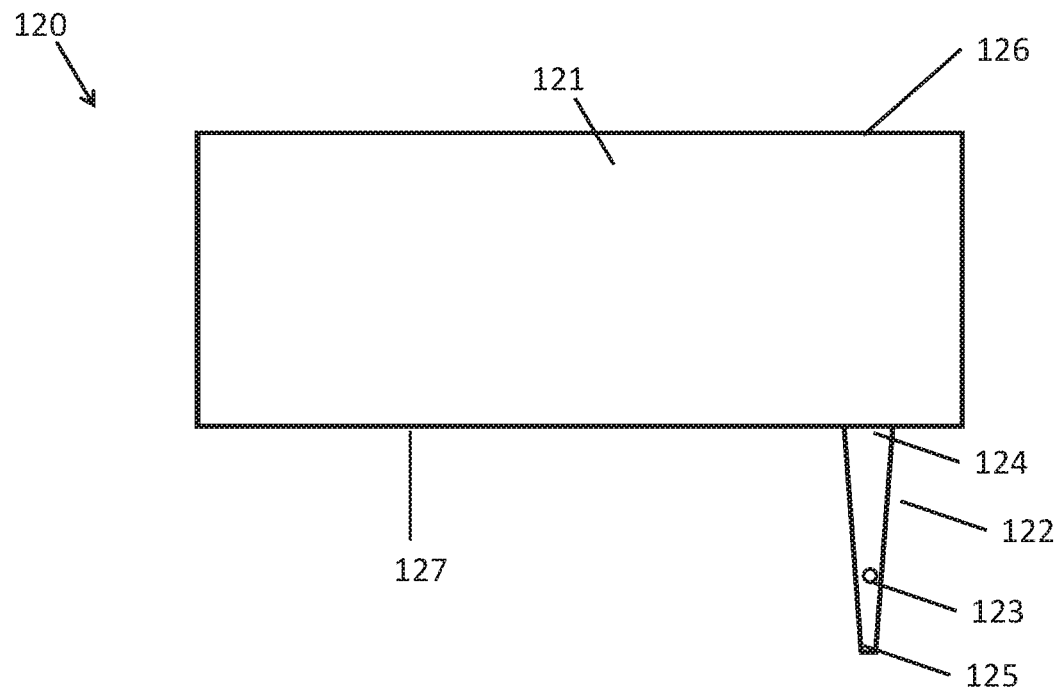
FIG. 1 shows a side view of a probe, according to an embodiment.

The present disclosure describes a simple procedure to create diamond probes and the associated probes for scanning probe applications. According to an embodiment, minimum fabrication steps may be implemented to obtain a large quantity of probes in parallel. The size of the probes may be designed to be large enough to be compatible with commercial tipless AFM cantilevers. The present disclosure also describes integration of a micro-antenna onto an AFM chip, which may deliver RF excitation to the NV center located inside a nano-photonic waveguide structure.

Scanning nitrogen vacancy (NV) center magnetometry offers significant detection sensitivity, spatial resolution, versatility, and non-invasiveness. However, it is challenging to integrate this technique with existing scanning probe technology. This challenge originates in its heavy fabrication processes and small physical dimensions of probes. According to an embodiment, the present disclosure describes an elegant and effective method to fabricate the probes and integrate them onto silicon cantilevers with radio frequency (RF) delivery capability. This defines the significant step towards integration with current AFM technology. According to an embodiment, the probe pillars may have a taper angle that may act as a waveguide to improve measurement capabilities. As used herein, the terms taper angle, half-taper angle, and half-apex angle are used interchangeably unless context implies otherwise. A half-taper angle of a conically shaped member is the angle from the center-line of the cone (perpendicular to the base) to an edge of the cone. Such terminology also applies similarly to non-conical pillars, as one of ordinary skill in the art would understand. For example, the half-taper angle may be defined as the angle between the face of a pyramid and the center-line of the pyramid perpendicular to the base.

Detection and imaging of weak magnetic fields at the nanoscale is a topic of critical importance in basic science and technology due to its wealth of applications. Many techniques such as magnetic force microscope (MFM), magneto-optic Kerr effect (MOKE), Lorentz microscopy, and nanoscale superconducting quantum interface devices (SQUID) may be used to investigate magnetic properties. For these techniques, scanning probe based approaches play a particularly important role as they constitute the only approach to routinely provide nanoscale spatial resolution, combined with the ability to sense weak magnetic sources. The isolated electronic spin system of the Nitrogen-Vacancy (NV) center in diamond offers unique possibilities to be employed as a nanoscale sensor for detection and imaging of weak magnetic fields. Scanning nitrogen vacancy (NV) center magnetometry has significant detection sensitivity, spatial resolution, versatility, and non-invasiveness have been demonstrated by many research groups over the last few years. A major challenge is the commercialization of this technique by integrating it into existing scanning probe technology.

FIG. 1 shows a side view of a probe 120 according to an embodiment. The probe 120 comprises a substrate 121, a pillar 122, and an engineered defect 123. The pillar 122 is attached at base 124 of the pillar 122 to substrate 121 at a first surface 127. In one or more embodiments, the pillar is integral with the substrate. In some embodiments, the pillar is part of the same single crystal used as the substrate. As discussed in the present disclosure, pillar 122 may be manufactured by etching substrate 121. The pillar 122 extends from base 124 to tip 125, and contains therein one or more engineered defects, such as an NV center. The probe 120 may be affixed to an AFM system at surface 126, for example using a UV curable adhesive, as discussed in more detail in the present disclosure. As discussed in the present disclosure, the pillar 122 may be manufactured so as to have a taper from base 124 to tip 125. This taper may have an angle, and may function as a waveguide for light collection.

According to an embodiment, the pillar may be manufactured to have a diameter between 200 nm and 1 µm measured at the tip thereof. The diamond substrate may be of a generally rectangular shape having edges of with lengths of 2 cm or more. According to another embodiment, the substrate may be circular, or another shape. The thickness of the etched substrate may be between 20-80 µm. The etched substrate may be between 2 and 160 times the height of the pillar. The size of the probe may be varied to accommodate various production and end use requirements. In some embodiments, the tip of the pillar is circular and the overall pillar geometry is conical. The pillar can also have a square or rectangular tip geometry with a corresponding taper to the pillar base. The pillar may take on a variety of shapes and sizes, according to one or more embodiments. The cross-sectional shape of the pillar may vary throughout the length thereof.

I. Manufacturing Monolithic Nanopillars

Figure 2:
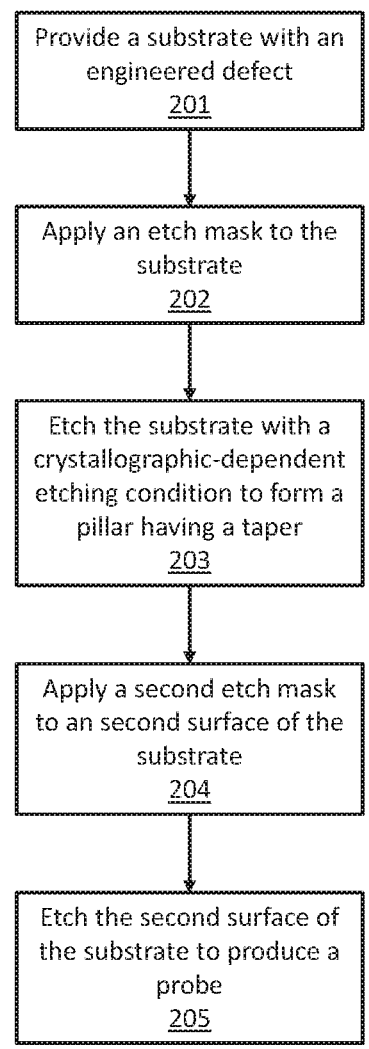
FIG. 2 shows a method of making a probe, according to some embodiments.

FIG. 2 shows a method of making probe, such as the probe 120, according to an embodiment. At step 201, a substrate may be provided with at least one engineered defect. The at least one engineered defect may be, for example, an NV center. The engineered defect may be near a first surface of the substrate of the substrate in a region where at least one pillar may be formed. According to an embodiment, a plurality of engineered defects are provided in the substrate. The plurality of engineered defects may have a density configured to increase the likelihood that each pillar to be formed on the surface of the substrate has at least one, or only one engineered defect. According to an embodiment, the density sufficient to have at least one defect per pillar may be on the order of $10^9$ defects/cm$^2$, for example, between $1\times10^9$ and $9\times10^9$ defects/cm$^2$. Different densities may be implemented to accommodate pillars of different sizes and/or implementations here more than one defect is desired per pillar.

At step 202, an etch mask may be applied to the substrate. The etch mask may be configured to mask portions of the substrate used in the formation of the pillars. The etch mask may consist of one or more disjointed mask portions. The mask portions may be formed in any desired shape, such as a circle, square, rectangle, or other shape. The pillars will generally take on a cross sectional geometry that approximates the mask shape. According to some embodiments, the density and/or location of the mask portions may be matched with the density of a plurality of engineered defects so as to increase the likelihood that each pillar to be formed on the surface of the substrate has at least one, or only one engineered defect.

At step 203 the substrate is etched with a crystallographic-dependent etching condition. In one or more embodiments, etch is a dry etch process, such as reactive ion etching inductively coupled plasma (ICP-RIE). The etching may form a pillar having a taper from the base to the tip thereof. The taper may comprise a taper angle which is controlled by the crystallographic-dependent etching condition, as described in the present disclosure. According to an embodiment, the crystallographic-dependent etching condition is an RF substrate power. In other embodiments, the taper angle is controlled by aligning the etch mask to a crystallographic direction of the substrate. In other embodiments, the taper angle is controlled by adjusting an electron beam lithography (EBL) exposure dose of the first mask and adjusting an RIE-ICP recipe of the etching the first surface. According to some embodiments, the taper angle may be greater than zero, greater than 3.4°, greater than 7.5°, greater than 11.5°, greater than 21°, greater than 30°, and/or not more than 35°. According to other embodiments, the taper angle may be between 3.4 and 35 degrees, between 7.4 and 30 degrees, between 11.5 and 21 degrees, between 21 and 30 degrees, or between 30 and 35 degrees. In other embodiments, the taper angle can be in a range that is bounded by any value disclosed herein. The taper angle of the pillar may be determined by a faceting characteristic of the substrate. As discussed in the present disclosure, this taper may function as a waveguide to increase detection efficiency. For example, an index of refraction can be defined inside a pillar. A smooth taper shape of a pillar changes the index of refraction to match the bulk diamond's index of refraction (for example, the index of refraction of the substrate. Therefore, this helps guiding the light going from one index of refraction environment to another.

At step 204 a second etch mask is applied to a second surface opposite the first surface of the substrate. The etch mask may be applied in areas that contain the pillar. For example, the second etch mask may be provided directly opposite the pillar so as to mask the pillar from being etched. The second mask can also be larger than the pillar to provide a base for supporting the pillar in the probe. The mask can be shaped to locate the pillar in the center of the mask, or off-center of the mask. In locating the pillar off-center of the mask, the resulting probe locates the pillar at one of the probe. According to an embodiment, the second etch mask is configured to define the shape of the probes. The probes may be manufactured to any shape, such as a generally rectangular shape as discussed in the present disclosure. The shape of the probe may be configured to interface with existing AFM cantilevers or other attachment mechanisms to facilitate easy mounting thereon. According to an embodiment, the etch mask may mask a plurality of portions on the second surface corresponding to a plurality of pillars and probes. The etch mask may further define joints connecting the probes to a frame, as discussed in further detail in the present disclosure. The frame may be used during manufacturing to transport a number of probes. The probes may then be removed from the frame by disconnecting the probes from the joints.

At step 205 the second surface is etched to produce a probe, such as the probe described with reference to FIG. 1. The etching process removes material in the exposed portions of the surface. Etching is continued until the full thickness of the substrate across the substrate has been removed, releasing the probe from the substrate. In some embodiments, the etching may leave behind the probes attached to a frame by joints, as discussed in further detail in the present disclosure. The etching may include an RIE process, or other known etching techniques. Since tapers are not required for the sides of the probe, the parameters for RIE etching may be varied from the etching techniques used to form the pillars. As discussed in the present disclosure, the step 205 may produce a plurality of probes, where each probe has an associated pillar on a surface thereof. The plurality of probes may be connected via joints to a frame in order to more easily transport and characterize the probes. According to some embodiments, the method may further include characterizing the probes, affixing the probes to AFM chips, and/or placing an RF waveguide in close proximity to the probe as described in more detail in the present disclosure.

According to an embodiment, the method may further comprise forming lenses on the second surface of the substrate opposite to the pillars. The lenses may be formed during or after the step 205, and may form lenses in a variety of different shapes and configurations. The lenses may serve the function of light that travels from the engineered defect, through the pillar, and out the second surface of the probe. Accordingly, detection is made easier, since fewer or no additional lenses are required to help focus or collect light from the engineered defects.

In some embodiments, the fabrication of a diamond probe, suitable for NV center based magnetometry, comprises following steps or a subset thereof: (1) providing a substrate comprising diamond including at least one engineered defect; (2) applying an electron-sensitive film to a first surface of the substrate; (3) selectively exposing the electron-sensitive film to an electron beam; (4) selectively removing portions of the electron-sensitive film, thereby uncovering portions of the first surface of the substrate; (5) etching the uncovered portions of the first surface of the substrate to produce a plurality of pillars; (6) applying an etch mask film to a second surface of the substrate, the second surface of the substrate being parallel with the first surface of the substrate; (7) photolithographically patterning the etch mask film to uncover portions of the second surface of the substrate; and (8) etching the uncovered portions of the second surface of the substrate to produce a probe. According to some embodiments, the fabrication comprises only these steps, or a subset thereof, and does not comprise other steps. Since methods described herein may involve substantially fewer steps than other fabrication techniques, methods of the present disclosure can be faster, more efficient, less resource-intensive, and more cost-effective.

Sculpturing desired shapes in single crystal diamond is ever more crucial in the realization of complex devices for nanophotonics, quantum computing, and quantum optics. The crystallographic orientation dependent wet etch of single crystalline silicon in potassium hydroxide (KOH) allows a range of shapes to be formed and has significant impacts on microelectromechanical systems (MEMS), atomic force microscopy (AFM), and microfluidics. According to an embodiment, a crystal direction dependent dry etching principle in an inductively coupled plasma reactive ion etcher may be implemented, which selectively reveals desired crystal planes in monocrystalline diamond by controlling the etching conditions. Using this principle, monolithic diamond nanopillars for magnetometry using nitrogen vacancy centers may be fabricated. In these nanopillars, a half-tapering angle up to 30° may be achieved, which may lead to a high photon efficiency and high mechanical strength of the nanopillar. These results represent the first demonstration of a crystallographic orientation dependent reactive ion etching principle, which opens a new window for shaping specific nanostructures which is at the heart of nanotechnology. This principle may be applicable to structuring and patterning of other single crystal materials as well.

Focused ion beams for sculpting specially shaped individual elements and ion beam milling for controlled angle etch are two examples of sculpting techniques that are largely insensitive to crystalline directions. Taking advantage of the anisotropic nature of monolithic materials, crystal direction dependent wet etching techniques has been demonstrated, for example, for etching Si in KOH. In a KOH solution, the kinetics of chemical reactions vary on Si {100}, {110}, and {111} planes, leading to a crystallographic dependent etch. This wet etch recipe can process large amounts of samples in parallel, for example, in microelectromechanical systems (MEMS) technology. Having such similar techniques in a dry etch process is desirable as a tool for more advanced MEMS fabrication. In addition, it is particularly desirable in nano-electromechanical (NEMS) systems because wet chemical processes can be difficult to control precisely, especially in case of delicate nanoscale devices. According to an embodiment, crystal direction dependent etch can be achieved as a dry process on a single crystal diamond.

Crystallographic orientation dependent dry etching to obtain probes having selected tapers is described. According to an embodiment, anisotropic etching along multiple crystal directions in diamond is achieved by controlling the oxygen plasma conditions in an inductively coupled reactive ion etcher (ICP-RIE). Further, an underlying etching principle assists with diamond crystal direction dependent etching mechanisms. According to an embodiment, using this principle, Si—KOH etch may be resembled on diamond. This principle can be applied to other single crystal materials.

In reactive-ion etching (ME), etching mechanisms may include chemical reactions on exposed surfaces that form volatile byproducts and physical ion bombardments to enhance etch rate and directionality. Factors controlling etch dynamics include (i) reactive ion flux impinging exposed surfaces, which mainly depends on the concentration of reactive ions in plasma, (ii) the kinetic energy of ions that arrive onto exposed surfaces, which is determined by the negative DC bias between plasma and substrates without considering collisions in the cathode charge region, and (iii) the energy barrier for chemical reactions taking place, which is determined by substrate materials and can be anisotropic in certain single crystals. Under a constant reactive ion flux, the etching process is dominated by either the ion's kinetic energy or the energy barrier for chemical reactions. According to an embodiment, when the ion energy is closely tuned to this energy barrier and the chemical reaction limits the etching process, a high etch selectivity along crystallographic directions may emerge.

Figures 3A, 3B, 4:
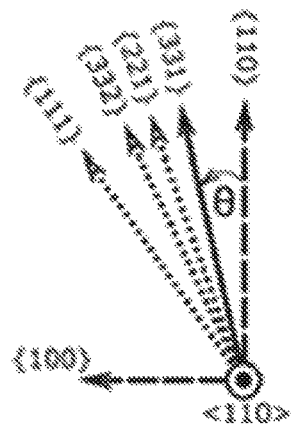
FIG. 3A-B shows information regarding the angles between faceted surfaces etched at different substrate powers and vertical planes, according to some embodiments.
FIG. 4 shows faceted surface angles, according to an embodiment.
Figure 5F:
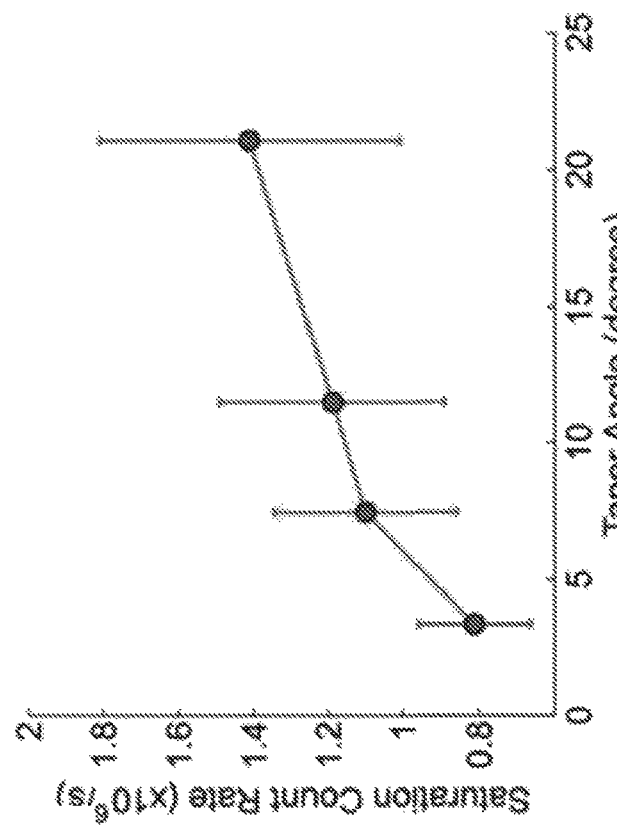
Figure 5E:
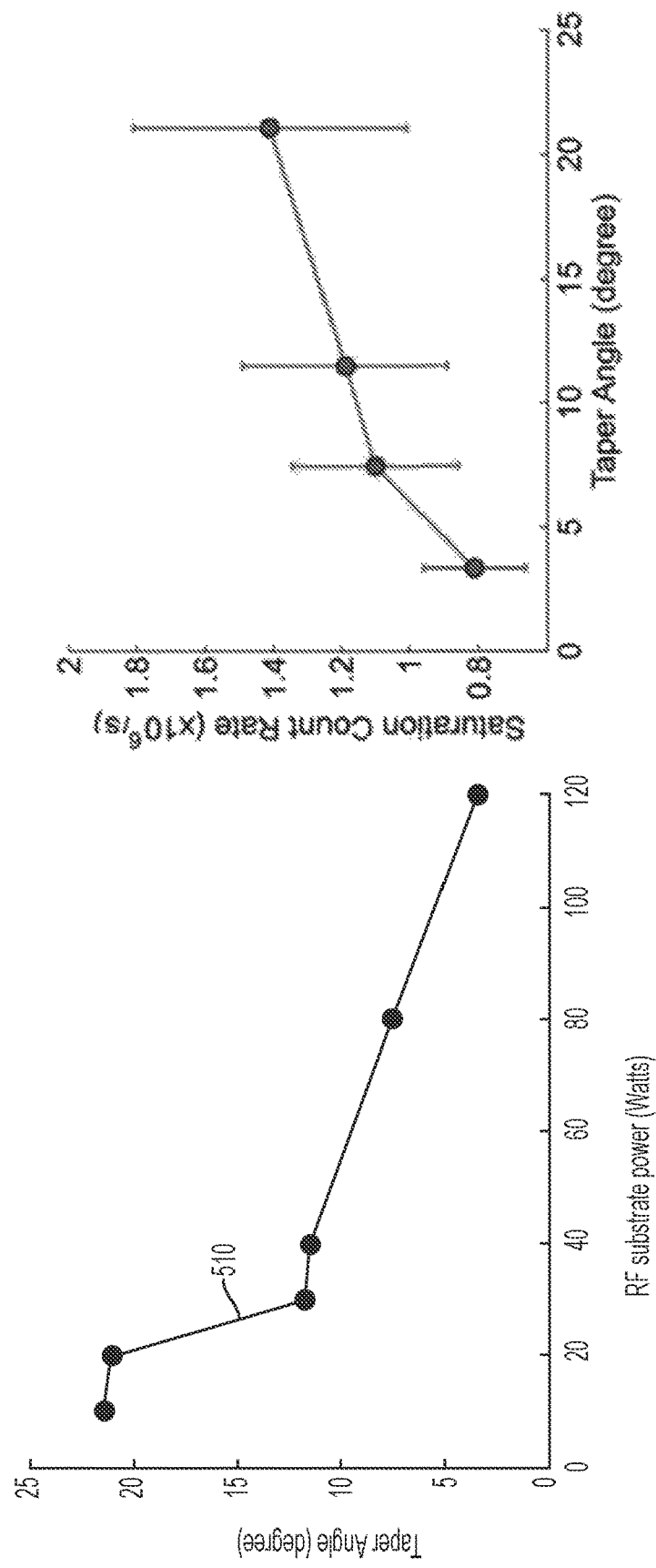

According to an embodiment, an application of the crystallographic orientation dependent etching technique is the fabrication of monolithic nanopillars with large tapering angles. Such waveguiding structures increase the photon collection efficiency of defect centers in diamond due to a combination of optical wave guiding and adiabatic changes of the effective local refractive index. FIGS. 5A-D show perspective views of monolithic nanopillars 501, 502, 503, and 504, according to some embodiments. As shown in FIG. 5A-D, tapering angles (half apex angle) of up to 21° may be achieved using the presented technique. Monolithic nanopillars 501, 502, 503, and 504 have half apex angles of 3.4°, 7.5°, 11.5°, and 21°, respectively. Other taper angles may be produced by adjusting the parameters discussed in the present disclosure. The taper angle as a function of the substrate power is measured using SEM and shown in FIG. 5E. The angle varies linearly with the substrate power when it is >40 W and is discrete at the lower power region. The switching effect seen at 510 in FIG. 5E indicates that the etching mechanism enters the surface chemical reaction limited regime where the kinetic energy of ions and crystalline bonding energy play major roles. This is consistent with the appearance of {331} facets at 30-40 W and {221} at 10-20 W as shown in FIGS. 4 and 5. FIG. 5F shows saturation fluorescence count rate from a single NV center inside the nanopillar as function of tapering angle. The error bars correspond to the standard deviation of 10-20 nanopillars in one angle. As can be seen in FIG. 5F, saturation count rate increases with larger taper angels that may be achieved by the techniques described in the present disclosure.

The saturated fluorescence intensity of a single NV center implanted 10 nm below the pillar's top surface is shown in FIG. 5F, according to an embodiment. A group of 10-20 nanopillars containing single NV centers was studied at each taper (half apex angle) angle. All nanopillars shown here have a top diameter of 350 nm and a length of 1.5 μm. However, other sizes may easily be produced. Average saturation count rate and standard deviation are shown in FIG. 5F. A larger taper angle yields a higher photon collection efficiency. With the techniques described in the present disclosure, larger taper angles compared to previous studies can be achieved. Beyond higher fluorescence collection efficiency, the larger taper angle of nanopillars strongly enhances the mechanical strength of the structure. This is particularly important in NV center-based scanning probe applications where the diamond nanopillar is scanned in contact over the sample surface.

According to some embodiments, the crystal direction dependent reactive ion etching principle may be implemented for selectively revealing crystal planes in monocrystalline diamond by varying etching conditions in an ICP-RIE system. According to an embodiment, adjustment of the reactive ion energy may be made to become comparable with the energy barrier for chemical reactions to take place on crystal planes, which leads to crystal direction dependent etch rates. As a direct application of this technique, fabrication of monolithic diamond nanopillars with tapering angles of up to 30° is possible, which yield high photon collection efficiencies from single NV centers and high mechanical strength. The etching principle presented here is applicable to other single crystal materials that hold crystallographic anisotropy and in other types of dry etching systems, such as reactive ion beam etch. According to some embodiments, a wide range of shapes in different single crystal materials for a broad variety of applications may be formed.

According to an embodiment, a method of diamond substrate preparation is provided. Electronic grade diamonds (4×4×0.5 mm3) provided by Element Six may be cut and polished by Delaware Diamond Knives. Cleaning the diamonds in a boiling mixture of approximately equal parts of sulfuric, nitric, and perchloric acid may be implemented to remove contamination and impurities. Subsequently, one surface of each diamond substrate may be strain relieved using an Ar/Cl and O2 RIE process. By doing so, a few micrometers of the top diamond surface may be removed. This top layer may have a large concentration of defects and dislocations accumulated during the polishing process. The smoothness of the diamond surface may also be benefitted from this strain relief process.

According to an embodiment, a method of diamond fabrication is provided. A diamond may be mounted onto a Si carrier chip (1×1 cm$^2$) with a strain relieved surface facing up using crystal bond for easy handling. This may be done using a hot plate at 150-180° C. to melt crystal bond. To promote the adhesion between the e-beam resist and substrate, 10 nm of Ti may be evaporated onto the substrate. Three layers of flowable oxide (FOx16, Dow Corning®) may be spin coated with each spun at 3000 RPM for 45 s and baked at 100° C. for 10 min. After baking, the FOx layer may be about 1 µm thick. The FOX layer may then be directly exposed with e-beam lithography at 100 keV energy and 5400 µC per cm$^2$ dosage. The exposed FOx layer may be developed in 25 wt % tetramethylammonium hydroxide (TMAH) for 30 s followed by a deionized (DI) water rinse and isopropyl alcohol (IPA) cleaning. This may form the etch mask for the RIE process. First, an Ar/Cl recipe may be used to remove the 10 nm Ti layer in the regions not covered by FOX. This may expose the bare diamond surface for the O2 etch process. After the RIE process, the substrate may be dipped in HF to remove residual Ti and FOX.

FIGS. 6A-B and 7A-B show a fabrication process for a nanopillar or nanopillars, according to an embodiment. The process may start with a single crystal diamond substrate 601 with NV centers implanted a few nanometers below the top surface, as shown in FIGS. 6A and 7A. During nitrogen implantation, the radiation dose may be chosen such that each nanopillar hosts on average a single NV center. This allows for production of a number of probes having single NV centers thereon. As a first step, an etch mask for nanopillars 602 is created by patterning flowable oxide (FOX) using electron beam lithography. The length of the nanopillar can be adjusted by the etching time. According to an embodiment, the length may be roughly 3.5 µm. Subsequently, nanopillars 602 are formed by plasma etching the sample. Depending on the plasma conditions for the reactive ion etching, the conditions can be tuned between anisotropic etching due to physical bombardment to isotropic chemical dry etching. This determines the shape of the nanopillars, as discussed in the present disclosure, which can range from purely cylindrical with a length of a couple of microns and a diameter of several hundreds of nanometers to strongly tapered with a half opening angle of up to 30 degrees.

FIGS. 8A-D show nanopillars with various taper angles, according to some embodiments. As shown in FIG. 8A, a diamond plate 801 may be provided with an etch mask 803. Afterward, the diamond plate 801 may be subject to any of RIE conditions 804, 814, and 824 to produce nanopillars 805, 815, or 825, respectively, having various levels of tapering, as shown in FIGS. 8B-D). According to some embodiments, the taper angles may be at or between 0° (i.e., not tapered), 5.5°, 11°, 20°, 26°, and/or 30°. According to some embodiments, taper angles up to 40° are possible. This process enables the fabrication of nanopillar structures which exhibit the best compromise between mechanical stability and photon collection efficiency given the desired mode of operation (tapping mode, contact mode, etc.) and measurement environment (amount of background from sample, etc.).

FIGS. 6C-D and 7C-D show a method of forming probes, according to an embodiment. FIGS. 6C and 7C, a next step may define the outline of the probes by creating a titanium etch masks 603 on the bottom surface 604 of the sample via optical lithography (i.e., via photoresist), thermal evaporation and lift-off, according to an embodiment. For this, a photolithographic mask 603 may be aligned with respect to the diamond nanopillars 602 visible on the upper side 606 of the substrate such that the nanopillars are close to the front apexes 607 of the probe. The probe dimensions may be chosen to be any appropriate size, such as 125 µm in length, 50 µm in width, and 50 µm in thickness, resembling an elongated cube shape. The thickness of the etched substrate may be between 15-85 µm, 20-80 µm, 30-60 µm, or 40-40 µm. In other embodiments, the taper angle can be in a range that is bounded by any value disclosed herein. The etched substrate may be between 2 and 160, 5 and 120, 10 and 80, 15 and 40, or 20-25 times the height of the pillar. In other embodiments, the taper angle can be in a range that is bounded by any value disclosed herein. The size and shape may be varied in order to optimize the probes for attachment to a measurement platform, as described in the present disclosure, such as an AFM instrument. After exposing and developing the photoresist, a 400 nm thick layer of titanium may be thermally evaporated on the structured diamond surface. After lift-off of the photoresist mask, this layer may serve as an etch mask during the subsequent dry etching step.

According to an embodiment, in a last step, the sample may be etched from the bottom surface 604 using O2 reactive ion etching which removes all parts of the diamond which are not covered by the titanium mask through its entire thickness. As shown in FIGS. 6D and 7D, the probes 605 have the final shape of a rectangular block, slightly tapered on one side. Towards the tapered end, the nanopillar 602 hosting the NV centers is positioned near the edge. Placing the NV center near the edge may increase detection sensitivity.

Figure 9:
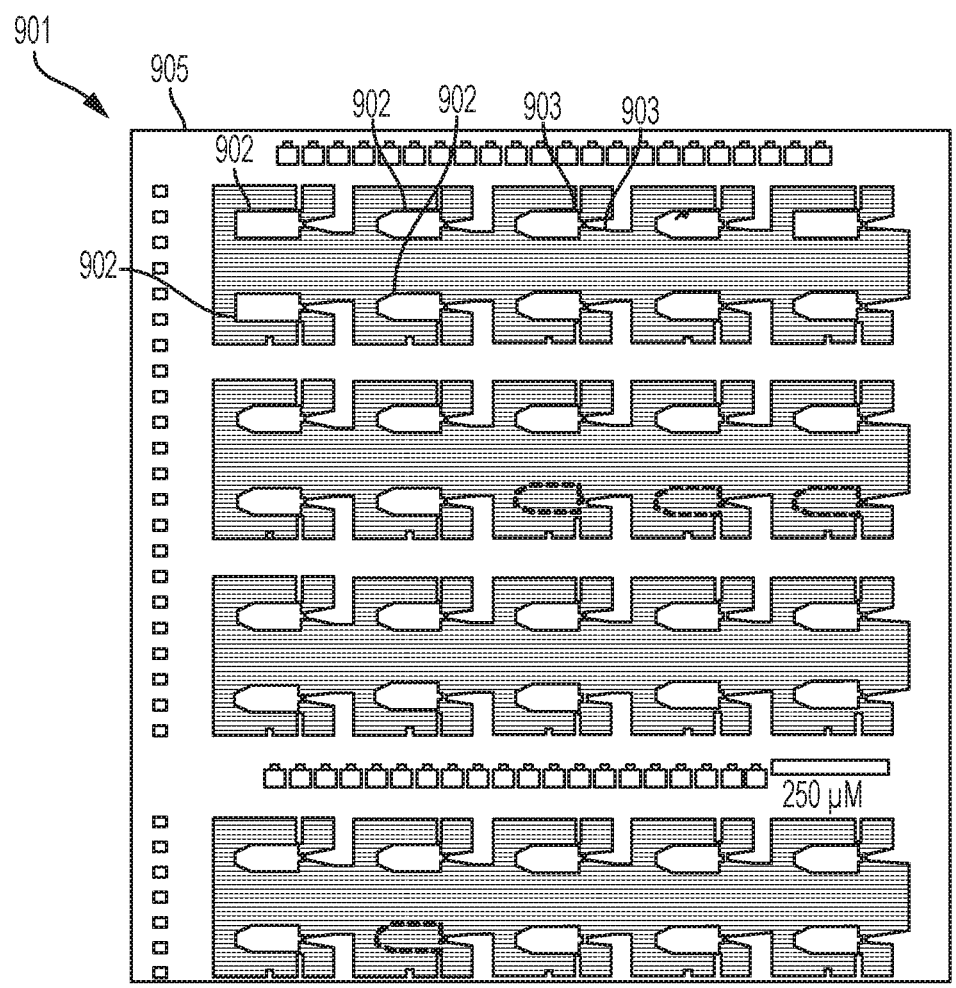
FIG. 9 shows an optical image of a diamond substrate having a plurality of probes.
Figure 19:
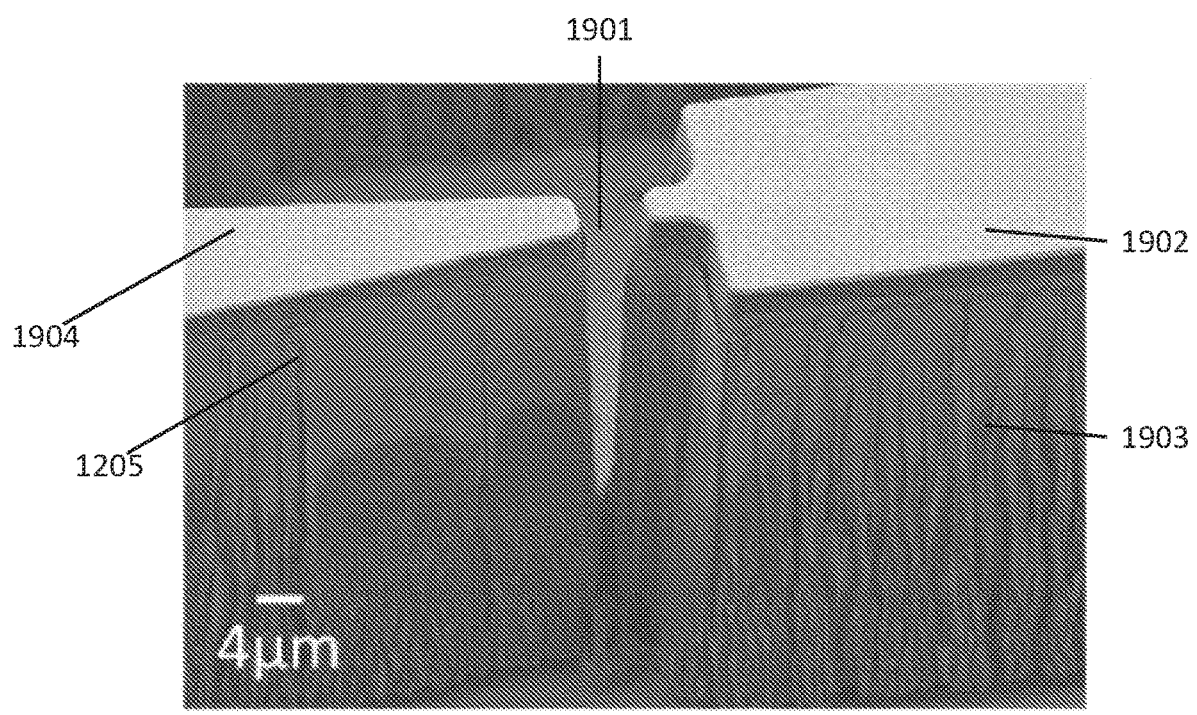
FIG. 19 shows a joint, according to an embodiment.

FIG. 9 shows an optical image of diamond substrate showing diamond probes after fabrication. As shown in FIG. 9, many tens of probes 902 may be fabricated out of one diamond substrate. Each probe is weakly attached to a larger frame 905. The bridges 903 connecting the probe 902 with the frame 905 are designed to be strong enough to withstand wet chemical treatment yet weak enough to be broken when attaching the probes to bigger platforms. The entire matrix can be handled with tweezers. According to an embodiment, after removal of the residual titanium layer, the array 901 of individual diamond probes 902 may remain which are attached by tiny joints 903 to the substrate frame. As shown in FIG. 19, a small gap 1901 in the etch mask 1902 for the probe 1903 and etch mask 1904 for the frame 1905 may produce tiny joints that have a thickness smaller than the probe. Referring to FIG. 9, the probes 902 may be patterned globally in a number of different arrangements, and may be arranged so as to increase the likelihood of having a single NV on each probe.

According to an embodiment, the entire diamond substrate may be cleaned in a boiling acid mixture consisting of equal parts of sulfuric, nitric, and perchloric acid to remove contaminants from fabrication and to oxygen terminate the surface. Diamond fabrication is hard partly due to required acid cleans. According to an embodiment, the methods described in the present disclosure reduce a number of acid cleans to only one at the final step. When designing the photolithographic mask and also during the optimization of the plasma etching recipe, special attention may be given to the size and shape of the joints. The joints may be designed to be strong enough not to break during wet chemical treatments (acid clean) of the entire structure, yet weak enough to allow the diamond cubes to be released when attaching the probes to a scanning platform as described below. The fabrication process described in the present disclosure may yield roughly 52 probes on a 2×4 mm² substrate.

According to an embodiment, the etching may include multiple RIE processes. More particularly, a strain relief RIE process may include an $ArCL_2$ process with ICP power at 400 W, RF power at 250 W, flux at AR 25/$CL_2$ 40, pressure at 8 mTorr, and time lasting for 30 minutes, and further an $O_2$ process with ICP power at 700 W, RF power at 100 W, flux at $O_2$ 30, pressure at 10 mTorr, and time lasting for 15 minutes. A pillar etch RIE process may include strain relief RIE process may include an $ArCL_2$ process with ICP power at 400 W, RF power at 250 W, flux at AR 25/$CL_2$ 40, pressure at 8 mTorr, and time lasting for 0.5 minutes, and further an $O_2$ process with ICP power at 700 W, RF power at 100 W, flux at $O_2$ 30, pressure at 10 mTorr, and time lasting for 10-12 minutes. A probe etch RIE process may include an $O_2$ process with ICP power at 700 W, RF power at 100 W, flux at $O_2$ 30, pressure at 10 mTorr, and time lasting for 5 minutes. These values may be adjusted depending on substrate properties, desired sizes, and desired characteristics.

According to another embodiment, the tapered pillars may be manufactured using a combination of electron beam lithography (EBL) and reactive ion etching-inductively coupled plasma (RIE-ICP) recipes. A negative electron beam resist such as FOx25 from Dow Corning® may be used as a mask agent. $O_2/O_2+CF_4$ plasma may be used. Top and bottom diameters of the pillars may be independently controlled by tuning the EBL exposure dose of the resist and the corrosion rate of the mask by adjusting plasma parameters. For example, the adjustment may be accomplished during etching by adjusting ICP power and substrate power so as to optimize the taper angle.

II. Affixing Diamond Probes on Afm Cantilevers

Commercial AFM instruments use standardized holder chips with small cantilevers to hold probes. Using only basic micromanipulators and a simple long working distance optical microscope, the diamond probes of the present disclosure may be attached to such cantilevers using UV-curable adhesive. Accordingly, the scanning-probe NV platform is compatible with existing AFM technology, making NV magnetometry more accessible.

Two of the most common AFM feedback platforms are optical beam deflection and quartz tuning fork. Commercial AFM instruments may rely on the former due to its compatibility with quickly exchangeable and standardized silicon cantilevers. However, homebuilt scanning-probe setups may use conventional quartz tuning fork based sensors due to their simple implementation and compatibility with low temperature conditions. According to an embodiment, the diamond probes described in the present disclosure can be reliably integrated into both of these platforms using very basic equipment and simple procedures. It should be appreciated that integration of the probes described in the present disclosure may be accomplished with other commercially available platforms using the techniques described in the present disclosure or with simple modifications thereto.

Figure 10A:
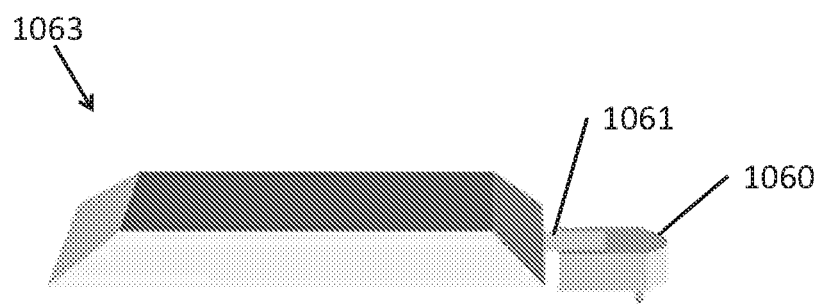
Figure 10B:
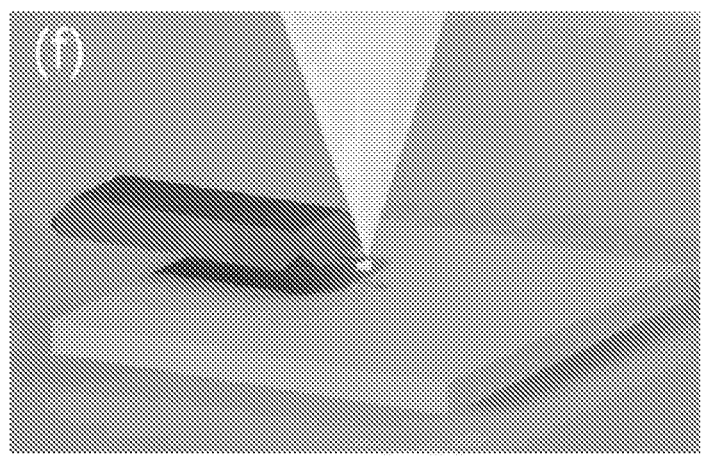

As shown in FIG. 10A, for the case of an AFM beam deflection sensors 1063, the probe 1060 may be directly glued to a tipless AFM cantilever 1061, according to an embodiment. For this, a small drop of UV curable adhesive is applied to the top surface of a diamond cube. Under an optical stereo microscope, the AFM cantilever may then be mounted to a manual translation stage and positioned on top of a diamond cube touching the adhesive drop. After curing the glue under UV light, the diamond probe may be detached from the substrate frame by breaking the weak joints using a sharp tungsten tip mounted to a separate manual translation stage. The probe 1060 can then be further used in a scanning geometry using optical beam bounce methods as shown in FIG. 10B. According to another embodiment, a quartz AFM tip is covered with UV curable glue, and is hovered above a probe. The probe may still be affixed to a frame. The tip may be brought closer to the probe and, once in contact with the top surface of the probe, the glue may be cured via UV light. The probe may then be released from the frame by moving the tip away from the substrate.

As shown in FIGS. 10C-D, according to an embodiment, for the case of tuning fork based sensors, a diamond cube is first glued to a pulled quartz rod. As shown in FIG. 10C-D, the probe 1090 may be connected to a small quartz rod 1091 of an AFM instrument. As shown in FIG. 10D, the probe may include a single nanopillar 1092 as described in the present disclosure attached to the bottom surface 1093. The nanopillar 1092 and probe 1091 may be manufactured according to the techniques described in the present disclosure. According to an embodiment, the diamond probe 1090 may be attached to the quartz rod 1091 using UV-curable adhesive 1094.

Figure 10E:
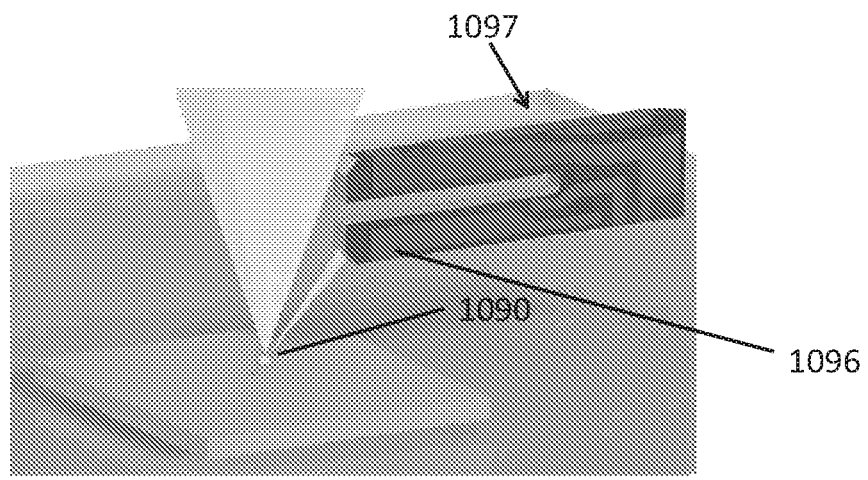

As shown in FIG. 10E, the quartz rod may then be attached to one prong 1096 of the tuning fork 1097. The mounting techniques described in the present disclosure do not require the use of any sophisticated equipment such as focused ion beam (FIB) assisted gluing and more time-consuming recipes involving nano-manipulation of the diamond slab. The increased size of the diamond probe mitigates these complications without compromising the optical performance of the probe or the spin properties of the embedded NV center. In addition, diamond cubes of 50 µm in size are ideally suited for use with commercial AFM cantilevers that are typically between 30 µm and 70 µm in width.

III. Characterizing PROBES

Figure 11C:
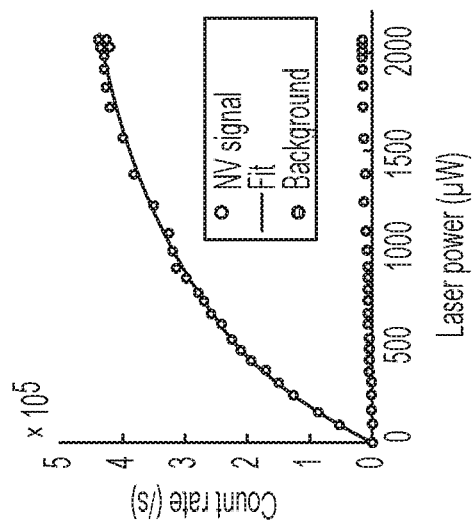
FIGS. 11A-C show graphical representations of characteristics of probes produced according to the methods described in the present disclosure, according to some embodiments.
Figure 11B:
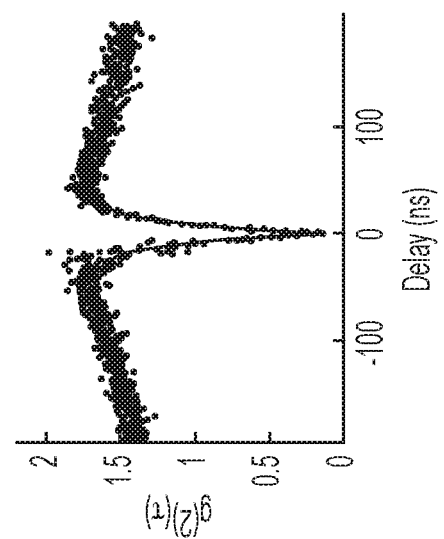
Figure 11A:
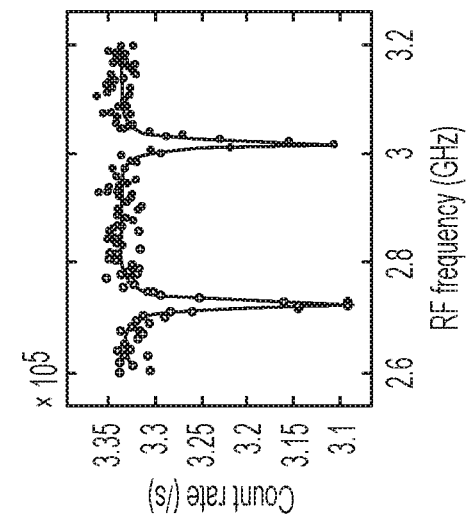

According to an embodiment, after manufacturing but before further processing and use, each diamond probe may be characterized. FIGS. 11A-C show characteristics of tested probes, according to an embodiment. The probes may be characterized in a confocal microscopy setup. First, as shown in FIG. 11A, optically detected magnetic resonance (ODMR) techniques may be used to identify all pillars hosting at least one NV center. As shown in FIG. 11B, nanopillars hosting only a single NV center may further be distinguished by performing second-order autocorrelation measurements. As shown in FIG. 11C, the brightness of these NV centers may be further determined by measuring their saturation count rate and saturation laser power. According to an example, on average, out of 52 probes on one substrate, 15 show strong, photostable, single NV center emission with a count rate of $200\text{-}500 \times 10^3$ per second and are therefore considered usable for further scanning probe application. According to an example, among these usable probes, the average coherence time T2 is found to be 61 µs. The T2 time of a specific NV center can vary strongly based on its location inside the nanopillar and its electric and magnetic environment as well as crystal strain. Paramagnetic spins on diamond surface and 13C nuclear spins are main sources of decoherence for shallow NVs inside nanopillars.

IV. RF Signal Drivers

According to an embodiment, another aspect of scanning NV center magnetometry is the need for an RF signal that drives and controls the NV center. This may be achieved using an RF waveguide that is fabricated onto a sample substrate or by introducing a small antenna loop in between the sample and an objective lens using additional translation stages. The former requires additional fabrication steps during sample fabrication and the latter results in increased experimental complexity. Therefore, the ability to integrate RF components onto the probe is desirable, in particular, for cryogenic applications.

Figure 12:
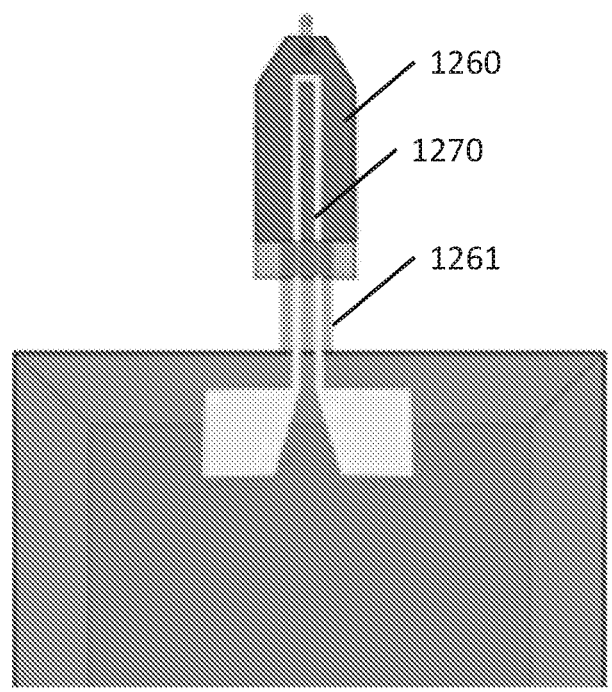
FIG. 12 shows a top view of an RF waveguide patterned onto a probe, according to an embodiment.

As shown in FIG. 12, the RF waveguide may be patterned onto the probe itself, for coherent manipulation of the NV spin state, according to an embodiment. A probe 1260 may be affixed to a cantilever 1261 (or other equivalent structure) as described in the present disclosure. An RF waveguide may be patterned thereon as described with reference to FIGS. 13A-C. As shown in FG. 13A, a shadow mask 1331 may be brought into close contact with the diamond probe 1261 after it has been glued to the AFM cantilever. As shown in FIG. 13B, a layer of Ti and/or Au may be evaporated though the mask 1331 onto the diamond probe 1390 such that it forms a strip line 1332 surrounding the nanopillar, for example, at a distance of a few microns. FIG. 13C shows a close-up SEM image of the diamond probe 1390 where the layer of Ti and/or AU 1332 is positioned on a top surface thereof. Other conductive layers may be used in order to provide for the RF waveguide, as well as various other patterned shapes.

The RF waveguide may be placed in close proximity to the probe. A person having ordinary skill in the art would understand that close proximity would involve placing the RF waveguide sufficiently close to the probe so as to allow for measurement techniques to be carried out with the probe. For example, at least a portion of the RF waveguide may be no more than 100, 50, 20, or 10 µm from a portion of the probe or the pillar. According to another embodiment, the RF waveguide may be on the probe.

Figures 14A, 14B:
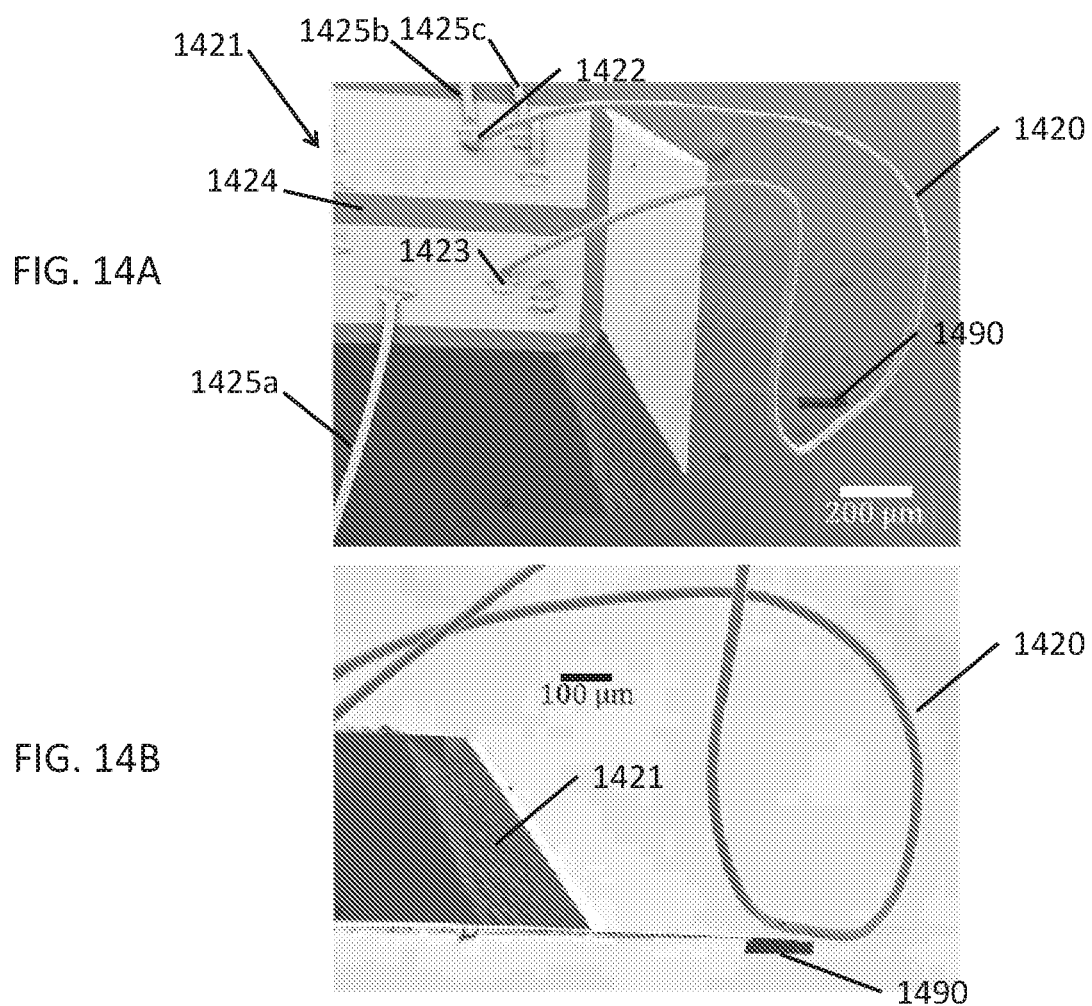
FIGS. 14A-B show an RF micro-antenna, according to an embodiment.

FIGS. 14A-B show a simple RF micro-antenna integrated right above the diamond probe attached to a silicon cantilever, according to an embodiment. The micro-antenna 1420 may be wire-bonded to the silicon AFM chip 1421 at points 1422, 1423 and bent by a tungsten tip (not shown) mounted to a linear translation stage (not shown) to be positioned in proximity to the diamond probe 1490. A 500 nm thick oxide layer 1424 may be initially grown on the silicon chip in order to provide electrical insulation between the bond pads. The bond pads may then be connected to an RF source, for example, via at least some of leads 1425a, 1425b, 1425c, and/or other leads, in order to apply the RF signals in close vicinity of the NV center in probe 1490. In this way, Rabi oscillations of the NV center can be driven over a wide frequency range with an input power of 30 dBm, as shown in FIG. 15A. Rabi frequencies as high as 4.8 MHz can be reached at an input power of 35 dBm, as shown in FIG. 15C. According to an embedment, Rabi frequency of 4.8 MHz can be observed at 1.75 GHz at 400 G with micro-antenna input power at 35 dBm. The decreasing Rabi rate at higher frequencies is consistent with the microwave transmission measured using a network analyzer. According to some embodiments, a silicon AFM chip may be fabricated such that an RF stripline can be lithographically patterned nearby the cantilever. According to an embodiment, placement of the RF micro-antenna in close proximity to but not in direct contact with the probe itself reduces the transfer of heat between the micro-antenna and the probe.

FIG. 15D shows an AFM measurement as well as a magnetic field scan using a probe in accordance with the present disclosure. The AFM height measurements were performed using Bruker Bioscope Catalyst™ in contact mode to map out the topography of a calibration sample consisting of about 178 nm deep square pits in 10 µm pitch. FIG. 15D correctly matches the real shape of the pits as confirmed by AFM measurements using sharp commercial AFM tips. Given the rather large footprint of the diamond probe in comparison to the nanopillar height, it is beneficial not to tilt the probe by more than 8° relative to the sample surface. A tilt in excess of 8° may cause the edge of the probe rather than the nanopillar to touch the sample surface.

FIG. 15B shows the mechanical resonance spectrum of a cantilever with and without the diamond probe in accordance with the present disclosure. The fundamental mode of the tipless cantilever was at 17 kHz, and was shifted to 2.9 kHz with the diamond probe attached due to the additional mass added to the cantilever. However, the quality factor of the resonance was not affected by the added mass.

V. Additional Manufacturing Techniques

FIGS. 16A-D show a crystal direction dependent etch in a monocrystalline material 1101, according to an embodiment. While crystal direction dependent etch is shown here for a square perimeter mask, resulting in a V-shaped grove, the techniques described herein can be used with a solid mask to obtain tapered pillars according to one or more embodiments. As shown in FIG. 16A, an etch mask 1103 may be lithographically patterned on substrate surface 1105. As shown in FIG. 16B, reactive ions 1114 may be accelerated by self-bias to bombard the substrate surface 1105, for example, in a U or square shaped pattern. If the etch rate in a normal direction 1120 is greater than that in <hkl>, tapered {hkl} planes 1106b, 1107b, 1108b may develop. As shown in FIG. 16C, after etching, the mask 1103 may be removed and the etch profile 1112 is analogous to Si etch in KOH. As shown in FIG. 16D, a longer etch time may cause crystal planes 1106b, 1107b, 1108b to intercept at bottom 1109. According to an embodiment, the process may begin with a rectangular etch window defined on an oriented crystal substrate 1101. If the etch rate in <hkl> direction is slower than that in the vertical direction 1120, tapered {hkl} sidewalls will develop and grow until a V-shape is fully formed, as shown in FIGS. 16C-D.

According to an embodiment, ultrapure, monocrystalline, electronic grade (100)-oriented chemical vapor deposition (CVD) synthetic diamond substrates (13C natural abundance, Element Six) may be used as the crystal substrate 1101. The diamond surface 1105 may be polished by a commonly used method in polishing industry. For example, 1-2 nm of rms roughness in diamond can be achieved after polishing. The diamond surface 1105 may be further strain relieved to achieve an rms roughness of less than 1 nm. Prior to processing, diamond substrates may be cleaned in a boiling mixture consisting of equal parts sulfuric acid, nitric acid, and perchloric acid to remove organic contaminations and to oxygen terminate the surface. To define an etch mask 1103 using electron beam lithography, a layer of flowable oxide (FOX) may be spin coated on the sample using a 10 nm thick titanium layer as adhesion promoter. As shown in FIGS. 17A-E and 18A-G, on each sample, one group of rectangular etch windows is aligned with its edges parallel to the direction <100>, while another group of windows is aligned parallel to the direction <110>. The crystal orientation of the samples is independently verified in nitrogen vacancy (NV) center magnetometry experiments revealing crystal axis <111>. Etching may be conducted in the Plasma-Therm Versaline® ICPRIE system using approximately 900 W ICP power, 40 sccm $O_2$ flow rate, approximately 10 mTorr pressure, and approximately 10° C. substrate temperature by varying the substrate power from 0 to 120 W. An etch depth of 2-3 μm may be achieved for each sample by adjusting the etch duration for each given substrate power. Etch rates may be accomplished at various substrate powers.

As an example of the crystal orientation dependent etch, FIGS. 17A-E show several forms, such as a truncated square pyramid 1201 in FIGS. 17A-C, a V-shaped groove 1202 and a truncated rectangular pyramid 1203 in FIG. 17D. These forms are from the etching masks aligned to the direction <110> and etching at 5 W substrate power for 70 min. The faceted sidewalls, such as side wall {332} may have an angle of 25° with respect to vertical planes {110}. Flat etched surfaces 1204 and fine straight intersection lines 1205 are observed at the corners and between sidewalls and the bottom surface, as shown by the high magnification image in FIG. 17E. The visible polishing marks of approximately 1 nm rms roughness on the top surface are due to the initial polishing of the diamond and are not a result of the etching process. In contrast, the roughness of the etched sidewalls is not resolved indicating an rms roughness of far less than 1 nm. For the square ring shown in FIG. 17A, additional facets may be produced around the outside corners 1206, which are symmetric with respect to the diagonals <100>. Their intersections with the bottom surface 1208 (100) are close to angle direction <740> with an average angle of 60.4° to <100>. These corner facets are the result of different ion fluxes and diverted ion trajectories at the corners of the etch window. As shown in FIG. 17D, for steady ion bombardment along the long sides of the rectangular features, except at the end corners, only one facet may develop.

Figure 18A:
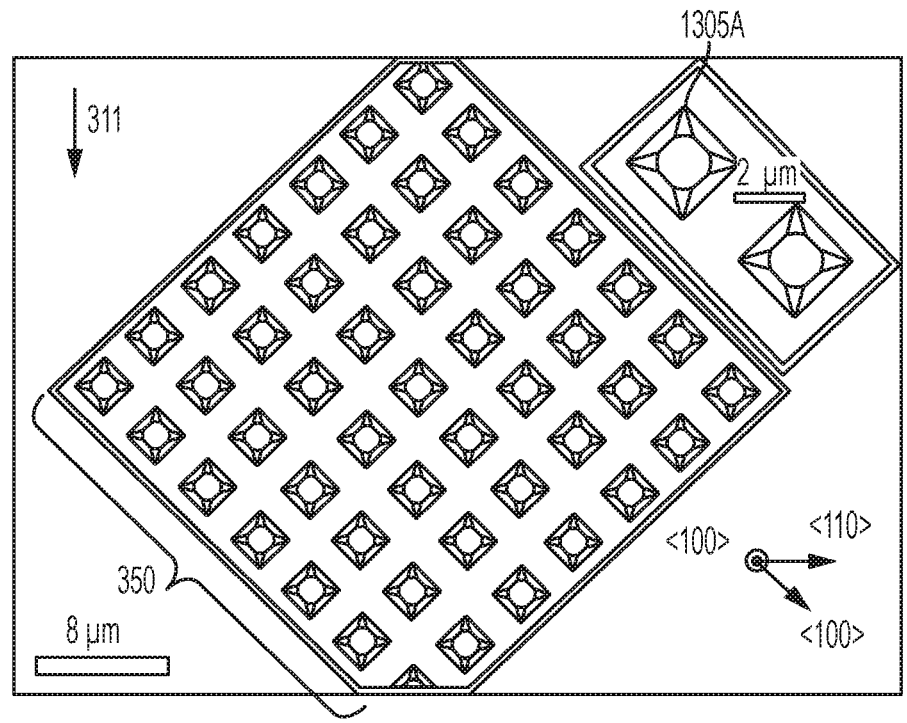
FIG. 18A-G show etched substrates, according to some embodiments.
Figures 18B, 18C:
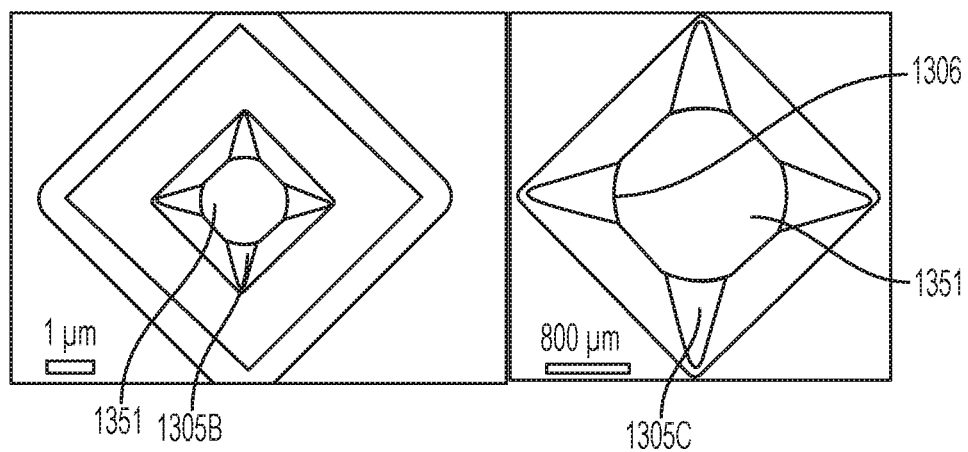
Figures 18D, 18E:
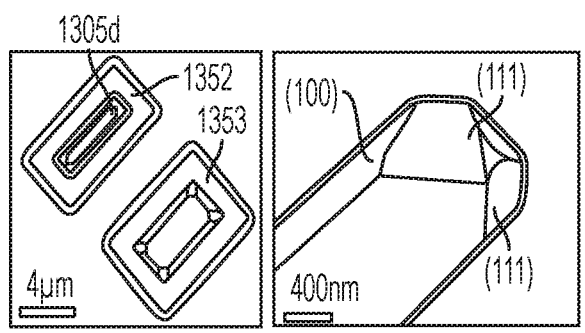
Figures 18F, 18G:
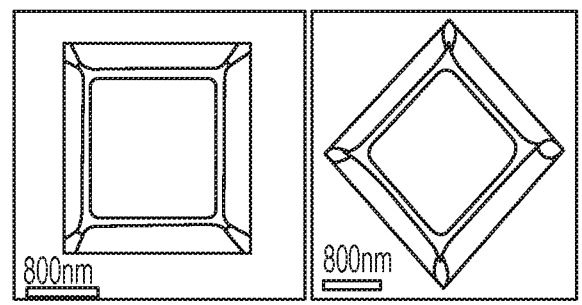

On the same sample, the etch masks may be aligned parallel to the direction <100>, according to an embodiment. The resulting etch profiles may be different. FIGS. 18A-G show a top view of additional etched features with the etch masks aligned parallel to the direction <100> as taken by SEM imaging, according to an embodiment. FIG. 18A shows an array of square patterns 1350 (close up in inset), according to an embodiment. FIG. 18B shows an isolated square feature 1351, with no extra out-corner facets, according to an embodiment. FIG. 183C shows a zoom in of square feature 1351 along with corner surfaces 1305c. FIG. 18D shows rectangular windows 1352, 1353 with different widths, due to smaller tapered angles of sidewalls, where sidewalls do not merge at the bottom. FIG. 18E shows facets produced at zero substrate power. FIGS. 18F-G show the disappearance of crystal anisotropy etch at 80 W substrate power, identical etch morphology obtained in both <110> and <100> aligned windows According to some embodiments, additional surfaces, such as surfaces 1305a, 1305b, 1305c, and 1305d at inner corners may emerge as shown in FIGS. 18A-D. These surfaces have an orientation very close to {111}, but are not flat. Similarly, the etched sidewalls parallel and perpendicular to direction <100> are curved and their intersections with the corner surfaces form arc lines 1306. These results imply that the faceting did not fully develop in direction <100> oriented windows at 5 W substrate power. However, when the substrate power was decreased further to 0 W, the faceting along planes {111} and vertical sidewalls {100} did appear, as shown in FIG. 18E, as indicated by the straight intersection lines and smooth flat etched surfaces. This crystal faceting at zero substrate power was also observed under etching conditions of 3000 W ICP power and 250° C. substrate temperature.

For etch masks with edges parallel to <110>, the angles between the faceted surfaces etched at different substrate powers and vertical planes may be measured with SEM and the respected Miller indices assigned accordingly, as shown in FIG. 4. These faceted planes have relatively low indices, intersect with the direction <110> (FIG. 4), and rotate around <110> axis from {111} family to {331} family as the substrate power increases from zero to 40 W, as illustrated in the inset of FIGS. 3A and 4. According to an embodiment, desired crystal planes can be revealed by varying the substrate power. FIG. 3B shows further RIE conditions and resulting pillar taper angles.

In contrast to the low power regime where selectivity is observed, at high substrate powers the etching anisotropy may be diminished. FIGS. 18F-G show the images of a sample etched at 80 W substrate power with windows aligned to directions <110> and <100>. The faceting disappears and cavities form at the corners due to heavier ion bombardment. The etching morphologies become identical despite these two differently oriented etching masks. Assuming that ions have no collisions after they move into the cathode charge region above the substrates, the potential energy of ions in the plasma will be entirely transferred to kinetic energy when ions arrive at the substrate surface. Therefore, a kinetic energy of 60 eV (40 W substrate power) is the threshold at which crystallographic etching in diamond may be observed. This demonstrates that diamond crystallographic etching follows the dry etching principle presented.

Figures 20A, 20B:
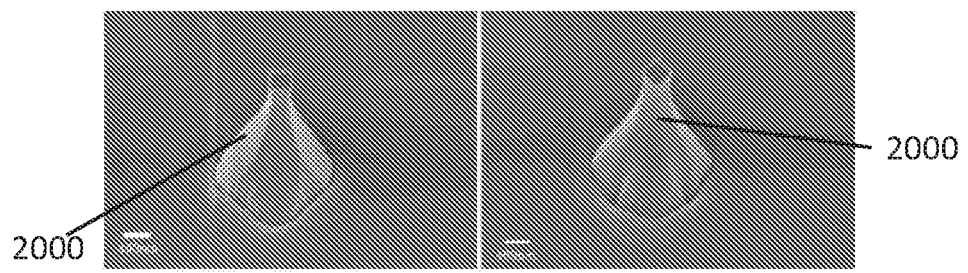
FIG. 20A-B show pillars constructed using faceting techniques, according to some embodiments.

By using this principle with appropriately shaped and oriented etch masks, pillars having particular taper angles along certain crystallographic directions may be produced. For example, as shown in FIG. 20A-B, square etch masks may be used in combination with the crystallographic-dependent technique described in the present disclosure so as to make pillars 2000.

Compared to previous fabrication procedures, the invention as described throughout the present disclosure presents at least four major improvements. First, according to an embodiment, fabrication techniques familiar to one skilled in the art may be used. For example, the probes may be fabricated using only optical and electron beam lithography in combination with wet and dry etching. Second, the radio frequency waveguide required for coherent manipulation of the NV's spin state may be integrated into the sensor by shadow mask metallization of a stripline close to the NV center. Third, the diamond sensor may be mounted on a commercial silicon AFM cantilever using micromanipulators and UV-curing adhesives. The sensor can therefore be integrated in virtually any commercial AFM setup without the need for further processing or fabrication steps. Finally, by tuning the plasma etching parameters, the precise shape of the nanopillar can be modified from fully cylindrical to conical with an opening angle of up to 30 degrees. This is achieved by balancing between chemical dry etching and etching due to physical bombardment and enables to balance between physical strength and optical collection efficiency of the nanostructure Although the present disclosure discusses examples including defects in the form of NV centers, other types of defects may be implemented. The techniques described in the present disclosure are compatible with other defects in diamond, such as, but not limited to silicon vacancy centers, germanium vacancy centers, and tin vacancy centers. Other types of defects are contemplated, in addition to other materials.

Although the present disclosure discusses examples including a single defect in each probe pillar, more than one defect in each probe pillar may be provided. For example, for NV centers, each center has a directionality associated with <111>, meaning that NV centers with one of four directionalities may be implemented. According to an embodiment, defects having two or more different directionalities may be used with sufficient densities to create pillars having two or more defects of different directionalities. This may increase the directional sensitivity of the pillars. However, providing pillars with multiple NV centers sacrifices spatial resolution of the probe.

Those skilled in the art would readily appreciate that all parameters and configurations described herein are meant to be exemplary and that actual parameters and configurations will depend upon the specific application for which the systems and methods of the present invention are used. Those skilled in the art will recognize, or be able to ascertain using no more than routine experimentation, many equivalents to the specific embodiments of the invention described herein. It is, therefore, to be understood that the foregoing embodiments are presented by way of example only and that the invention may be practiced otherwise than as specifically described. The present invention is directed to each individual feature, system, or method described herein. In addition, any combination of two or more such features, systems or methods, if such features, systems or methods are not mutually inconsistent, is included within the scope of the present invention.

The invention claimed is:

1. A probe system comprising:
an atomic force microscopy (AFM) chip;
an RF waveguide attached to the AFM chip, wherein the RF waveguide deviates from a plane in which the RF waveguide is attached to the AFM chip; and
a probe, the probe comprising:
a substrate having a first surface and a second surface opposite the first surface, and
a pillar, the pillar comprising:
a base connected to the first surface,
a tip opposite the base,
a tapered portion extending from the base toward the tip, the tapered portion having a taper angle, and
at least one engineered defect; and
wherein the second surface of the probe is attached to the AFM chip.

2. The probe system of claim 1, wherein a distance between the RF waveguide and the probe is no more than 100 µm.

3. The probe system of claim 1, wherein the second surface of the probe is attached to the AFM chip by an adhesive.

4. The probe system of claim 1, wherein the taper angle is between 3.4 and 35 degrees.

5. The probe system of claim 1, wherein the substrate further comprises a lens structure etched on the second surface for focusing light emitted by the at least one engineered defect in the pillar.

6. The probe system of claim 1, wherein a thickness of the substrate is between 2 and 160 times the height of the pillar.

7. The probe system of claim 1, wherein the probe is attached to one of a cantilever and a quartz rod of the AFM chip.

8. The probe system of claim 1, wherein the RF waveguide attached to the AFM chip comprises a metal strip applied to the second surface of the probe.

9. The probe system of claim 1, wherein the RF waveguide attached to the AFM chip comprises a metal wire attached to the AFM chip.

10. The probe system of claim 1, wherein the RF waveguide attached to the AFM chip comprises a metal layer disposed on the second surface of the probe and extending over an edge of the probe in the proximity of the pillar.

* * * * *